United States Patent
Hosokawa et al.

(10) Patent No.: US 7,983,311 B2
(45) Date of Patent: Jul. 19, 2011

(54) SIGNAL DETECTION DEVICE AND SIGNAL DETECTION METHOD

(75) Inventors: Shuya Hosokawa, Osaka (JP); Naganori Shirakata, Osaka (JP); Koichiro Tanaka, Hyogo (JP); Kenji Miyanaga, Osaka (JP); Koji Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 446 days.

(21) Appl. No.: 12/298,375

(22) PCT Filed: Apr. 23, 2007

(86) PCT No.: PCT/JP2007/058703
§ 371 (c)(1),
(2), (4) Date: Oct. 24, 2008

(87) PCT Pub. No.: WO2007/125846
PCT Pub. Date: Nov. 8, 2007

(65) Prior Publication Data
US 2009/0175299 A1    Jul. 9, 2009

(30) Foreign Application Priority Data

Apr. 26, 2006 (JP) .................................. 2006-121458
Nov. 8, 2006 (JP) .................................. 2006-302343

(51) Int. Cl.
*H04J 3/00* (2006.01)
(52) U.S. Cl. .................... 370/529; 370/465; 370/468
(58) Field of Classification Search .............. 370/465, 370/468, 475, 503, 529
See application file for complete search history.

(56) References Cited

U.S. PATENT DOCUMENTS

| | | | | |
|---|---|---|---|---|
| 7,336,738 B2 * | 2/2008 | Wakamatsu | ................. | 375/343 |
| 7,436,906 B2 * | 10/2008 | Goto | ................. | 375/316 |
| 2003/0067999 A1 | 4/2003 | Echavarri et al. | | |
| 2004/0247044 A1 | 12/2004 | Matsushita et al. | | |
| 2007/0014286 A1 * | 1/2007 | Lai | ................. | 370/389 |
| 2008/0019430 A1 * | 1/2008 | Suzuki et al. | ................. | 375/150 |
| 2009/0080385 A1 * | 3/2009 | Kim et al. | ................. | 370/336 |
| 2009/0323642 A1 * | 12/2009 | Tanno et al. | ................. | 370/336 |

FOREIGN PATENT DOCUMENTS

| | | |
|---|---|---|
| JP | 2000-349733 | 12/2000 |
| JP | 2001-127745 | 5/2001 |
| JP | 2001-177496 | 6/2001 |
| JP | 2003-115812 | 4/2003 |
| JP | 2003-143106 | 5/2003 |

OTHER PUBLICATIONS

International Search Report issued Jul. 25, 2007 in the International (PCT) Application of which the present application is the U.S. National Stage.

* cited by examiner

*Primary Examiner* — Kwang B Yao
*Assistant Examiner* — Nguyen Ngo
(74) *Attorney, Agent, or Firm* — Wenderoth, Lind & Ponack, L.L.P.

(57) ABSTRACT

A correlation unit (32) sequentially obtains correlation values between a baseband signal and a reference signal and outputs the obtained reference signal to a section division unit (33). The output of the correlation unit (32) is divided into symbol time periods by the section division unit (33). A section position detection unit (34) detects a largest correlation value in each of sections resulting from the division by the correlation unit (32) and outputs, to a synchronization judgment unit (35), first position information that indicates a relative position of each detected largest correlation value. The synchronization judgment unit (35) detects an arrival of a packet signal and estimates a symbol timing based on the first position information of the sections.

25 Claims, 26 Drawing Sheets

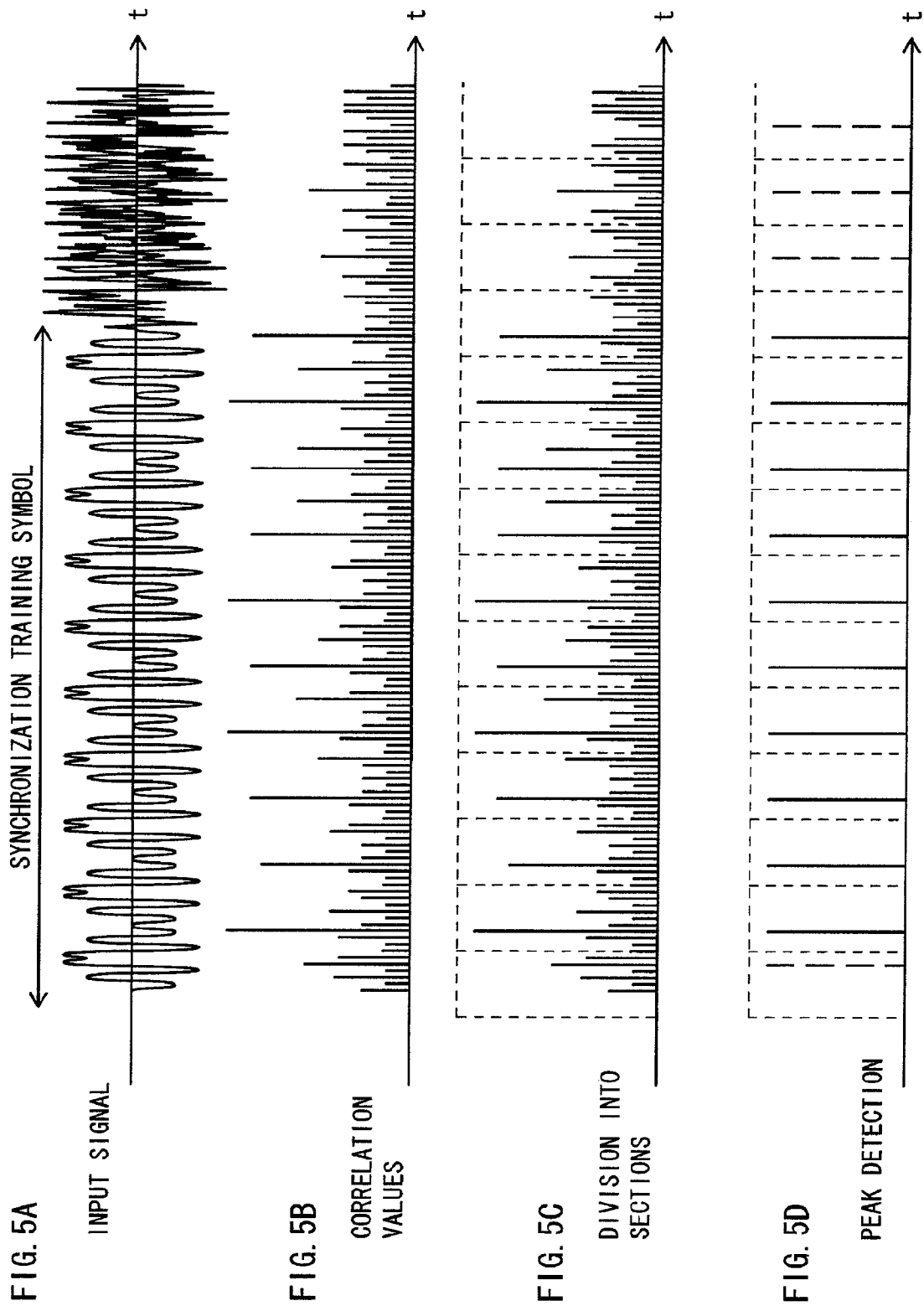

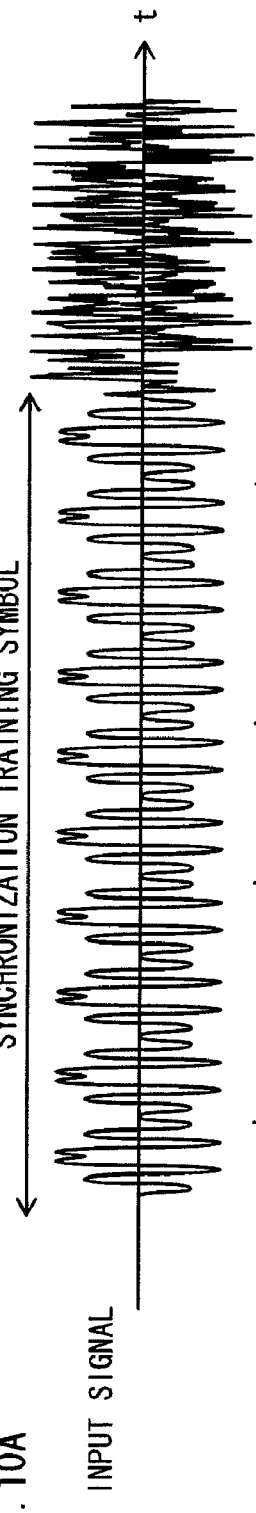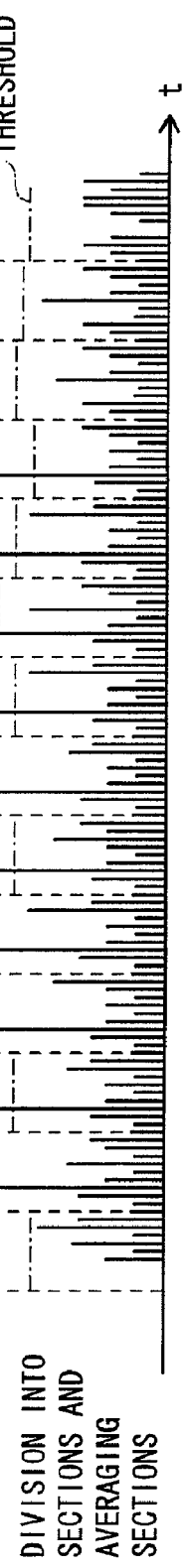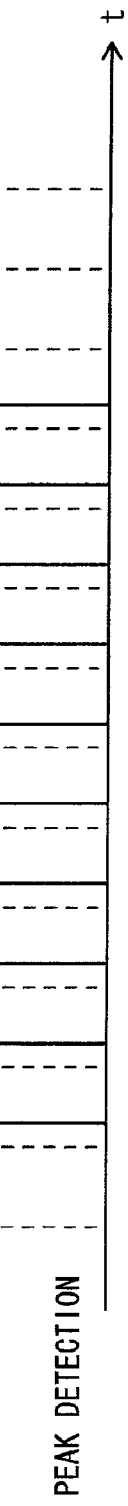
FIG. 10A  INPUT SIGNAL
FIG. 10B  CORRELATION VALUES
FIG. 10C  DIVISION INTO SECTIONS AND AVERAGING SECTIONS
FIG. 10D  PEAK DETECTION

SIGNAL DETECTION DEVICE AND SIGNAL DETECTION METHOD

TECHNICAL FIELD

The present invention relates to technology for detecting an arrival of a packet signal based on a plurality of signal waveforms having a predetermined pattern that have been added to the head of the packet signal.

BACKGROUND ART

In recent years, wireless LANs (Local Area Networks) have rapidly become popular. Standards of wireless LANs include, for example, IEEE (Institute of Electrical and Electronic Engineers) 802.11a using a 5.2 GHz bandwidth, and IEEE 802.11g using a 2.4 GHz bandwidth. In IEEE 802.11a and IEEE 802.11g, communication is performed with use of a multicarrier communication method called OFDM (Orthogonal Frequency Division Multiplexing).

The following describes an overview of processing for detecting the packet signal performed by a signal detection device provided in a receiver, when using the wireless LAN communication method that uses OFDM.

The transmitter adds a repeating signal, which is a training symbol repeated a plurality of times, to the head of the packet signal, and transmits the packet signal to the receiver. The training symbol is a symbol whose signal waveform has a predetermined pattern. Note that if the targeted wireless LAN uses, for example, the IEEE 802.11a standard, the training symbol is called a short training symbol.

The signal detection device sequentially obtains correlation values that correlate a reception signal with a pre-stored reference signal. The signal detection device compares each of the correlation values to a threshold determined according to a power level of the received signal, and detects positions on a time axis corresponding to correlation values that exceed the threshold. If a series of time intervals between adjacent detected positions is a repeating cycle of the training symbols, the signal detection device judges that the packet signal has arrived, and estimates a symbol timing as a reference for demodulating the packet signal (for example, see patent document 1).

Note that the reference signal used in conventional technology is the same signal as the signal waveform of the training symbol at the time that the training symbol was added to the head of the packet signal by the transmitter.

Patent document 1: Japanese Patent Application Publication No. 2001-127745

DISCLOSURE OF THE INVENTION

Problems Solved by the Invention

However, a received power level of training symbols transmitted on the wireless channel and received by the receiver may fluctuate due to fluctuation in the wireless channel. Also, waveform deformation occurs in the training symbols due to the wireless channel. For this reason, a correlation value between the training symbol received by the receiver and the reference symbol is normally not a fixed value, but is rather a different value for each received training symbol.

For example, when the received power level of the received training symbol decreases, the correlation value between the training symbol and the reference signal becomes smaller. For this reason, the more the received power level of the received training symbol decreases, the higher the possibility of the correlation value between the training symbol and the reference signal being less than or equal to the threshold, although normally the correlation value is expected to exceed the threshold. In other words, the possibility increases that the position that corresponds to the arrival timing of the training symbol, which is originally to be detected, cannot be detected. Accordingly, if the received power level of the received training symbol decreases, the ability of the conventional signal detection device to detect the arrival of the packet signal decreases.

Also, there are cases in which a transmitter or a receiver of another wireless communication system (hereinafter referred to as an interfering station) exists in the transmission area of the receiver that includes the signal detection device. In such an environment, there are cases in which a packet signal transmitted by the interfering station (hereinafter referred to as an interfering signal) is included in the reception signal received by the receiver, and the threshold determined in accordance with the received power level is influenced by the interfering signal.

For example, when the received power level of the interfering signal increases, the threshold determined based on the received signal power level increases. For this reason, the more the received power level of the interfering signal increases, the higher the possibility of the correlation value between the received training symbol and the reference signal being less than or equal to the threshold. In other words, the possibility increases that the position that corresponds to the arrival timing of the training symbol, which is originally to be detected, cannot be detected. Accordingly, if the received power level of the received training symbol decreases, the ability of the conventional signal detection device to detect the arrival of the packet signal decreases.

In view of this, an aim of the present invention is to provide a signal detection device and a signal detection method that have an improved ability to detect the arrival of a packet signal over conventional signal detection devices.

Means to Solve the Problems

In order to achieve the above aim, a signal detection device of the present invention is a signal detection device that detects an arrival of a packet signal in a reception signal, based on a plurality of symbols that are signal waveforms having a predetermined pattern and have been added to a head of the packet signal by a transmitter, the signal detection device including a correlation unit operable to sequentially obtain correlation values between the reception signal and a reference signal that is based on the plurality of symbols, and output the correlation values; a section division unit operable to divide the output of the correlation unit into sections that are each a time period having a fixed length; a section position detection unit operable to detect, for each of the sections, a correlation value that satisfies a predetermined condition from among the correlation values in the section, and output position information indicating a relative position of the detected correlation value in the section; and a synchronization judgment unit operable to detect the arrival of the packet signal based on the position information of the sections output by the section position detection unit.

A signal detection method of the present invention is a signal detection method for detecting an arrival of a packet signal in a reception signal, based on a plurality of symbols that are signal waveforms having a predetermined pattern and have been added to a head of the packet signal by a transmitter, the signal detection method including the steps of: sequentially obtaining correlation values between the reception signal and a reference signal that is based on the plurality of symbols, and outputting the correlation values; dividing the output of the obtaining step into sections that are each a time period having a fixed length; detecting, for each of the sections, a correlation value that satisfies a predetermined condition from among the correlation values in the section, and outputting position information indicating a relative position of the detected correlation value in the section; and detecting the arrival of the packet signal based on the position information of the sections output in the detecting step.

Effects of the Invention

The above-described signal detection device and signal detection method detect, for each section, a correlation value that satisfies a predetermined condition. For this reason, the present invention can detect a correlation value at a position corresponding to an arrival timing of a symbol even when, for example, the correlation value between the symbol being received and the reference signal has decreased, or the received power level of the interference signal has increased. The signal detection device and signal detection method can each detect the arrival of the packet signal provided that the positions of the detected correlation values include a position corresponding to the arrival timing of the symbol. Accordingly, the signal detection device and signal detection method both enable improving the ability to detect the packet signal.

In the signal detection device, the predetermined condition may be satisfied by a largest correlation value in each section.

In each of the sections, there is a high probability that a correlation value between the reception signal and the reference signal is largest at a position corresponding to the arrival timing of the symbol.

According to this structure, since detection of the arrival of the packet signal is not performed at positions that are not likely to be the arrival timing of the symbol, false detection of the arrival of the packet signal can be prevented as much as possible.

In the signal detection device, the predetermined condition may be satisfied by correlation values from a largest correlation value in each section to an Nth largest correlation value, inclusive, N being a predetermined value.

For example, if the reception signal is influenced by an interfering signal or noise, there is a possibility that in each of the sections, the correlation value between the reception signal and the reference signal is not largest at the position corresponding to the arrival timing of the symbol.

The signal detection device having the above structure detects the arrival of the packet signal based on the position of correlation values from a largest correlation value in each section to an Nth largest correlation value, inclusive, N being a predetermined value. For this reason, according to the above signal detection device, there is a higher possibility that the positions of the detected correlation values include the position corresponding to the arrival timing of the symbol, thus improving the ability of the signal detection device to detect the arrival of a packet signal.

The signal detection device may further include a section average value calculation unit operable to, for each section, obtain an average value of all correlation values in the section; and a section threshold determination unit operable to, for each section, determine a threshold for the section based on the average value of all the correlation values in the section obtained by the section average value calculation unit, and set the determined threshold in the section position detection unit, wherein for each section, the section position detection unit may detect a correlation value that satisfies the predetermined condition by comparing each correlation value in the section to the threshold set in the section to which the correlation values belong, and the predetermined condition may be satisfied by a correlation value in each section that is larger than a threshold set individually in each section.

For example, if the reception signal is influenced by an interfering signal or noise, there is a possibility that in each of the sections, the correlation value between the reception signal and the reference signal is not largest at the position corresponding to the arrival timing of the symbol.

The above signal detection device detects the arrival of the packet signal based on the positions of correlation values that are larger than the threshold in the section. For this reason, there is a high possibility of the positions of the detected correlation values including the position corresponding to the arrival timing of the symbol, thus improving the ability of the signal detection device to detect the arrival of a packet signal.

In the signal detection device, the fixed length may be a positive integral multiple of a length of time of one of the plurality of symbols.

According to this structure, for example, a judgment can easily be made as to whether a time interval between detected positions matches the length of time of one symbol (hereinafter referred to as "symbol time period").

In the signal detection device, the synchronization judgment unit may judge that the packet signal has arrived if a same position is indicated by the position information of a plurality of consecutive sections, and the number of the consecutive sections is greater than or equal to a predetermined number of consecutive sections.

This structure facilitates processing for judging whether the packet signal has arrived.

The signal detection device may further include a correlation value accumulation unit operable to obtain an accumulation value for each relative position over a predetermined accumulation section number of sections, by accumulating correlation values at a same relative position; and a judgment position detection unit operable to detect, from among the accumulation values obtained by the correlation value accumulation unit, an accumulation value that satisfies a predetermined judgment position condition, and to output judgment position information indicating a position of the detected accumulation value that satisfies the judgment position condition, wherein the synchronization judgment unit may detect the arrival of the packet signal at the position indicated by the judgment position information output by the judgment position detection unit.

In the signal detection device, the predetermined judgment position condition may be satisfied by a largest accumulation value.

In each section, a correlation value between the reception signal and the reference signal is normally larger at the arrival timing of the symbol than at other timings. For this reason, there is a high probability that an accumulation value obtained by accumulating correlation values of positions corresponding to the arrival timing of the symbol over a predetermined accumulation section number of sections is larger than an accumulation value obtained by accumulating correlation values of positions corresponding to timings other than the arrival timing of the symbol over the predetermined accumulation section number of sections.

According to the above signal detection device, since the arrival of the packet signal is not detected at a position which is not likely to be an arrival timing of the symbol, false detection of the arrival of a packet signal can be prevented as much as possible.

In the signal detection device, the synchronization judgment unit may judge that the packet signal has arrived if a number of matching sections among the predetermined accumulation section number of sections is greater than or equal to a predetermined number of matching sections, each matching section being a section whose position information indicates a same position as the position indicated by the judgment position information.

This structure facilitates processing for judging whether the packet signal has arrived.

The signal detection device may further include a storage unit storing therein the reference signal; and reference signal calculation unit operable to obtain a new reference signal based on the received packet signal, and to update the reference signal stored in the storage unit to the new reference signal, wherein the correlation unit may obtain the correlation values with use of the reference signal stored in the storage unit.

The signal waveform of the symbols added to the head of the packet signal included in the reception signal is different from the signal waveform of symbols at the time of transmission due to the influence of multipath and noise, etc. For this reason, there are cases in which the correlation value between the symbol being received and the initial reference signal is small, and the correlation value at the position corresponding to the arrival timing of the symbol does not satisfy the predetermined condition. Here, the initial reference signal is the same signal as the signal waveform of the training symbol at the time that the training symbol was added to the head of the packet signal by the transmitter.

In contrast, the above signal detection device obtains a new reference signal based on the packet signal received in the past, and uses the new reference signal for calculating correlation values. For this reason, the signal waveform of the new reference signal used for calculating the correlation values, for example, reflects the influence of multipath and the influence of noise, and compared to the signal waveform of the initial reference signal, is more likely to be similar to the signal waveform of the symbol being received.

Accordingly, the correlation values between the symbol being received and the new reference signal is likely to be larger than the correlation value between the symbol being received and the initial reference signal. As a result, there is a high likelihood of the correlation value at the position corresponding to the arrival timing of the symbol satisfying the predetermined condition, thus improving the ability of the signal detection device to detect the arrival of a packet signal.

The signal detection device may further include a reset unit operable to update the reference signal stored in the storage unit to a signal having a signal waveform that is identical to the predetermined pattern, if a predetermined reset condition is satisfied.

For example, if the reference signal calculation unit obtains a new reference signal by mistake, there are cases in which the reference signal obtained by the reference signal calculation unit does not reflect the current channel characteristic, due to fluctuation in the channel, etc. In this case, the signal waveform of the reference signal obtained by the reference signal calculation unit is not similar to the signal waveform of the received symbol. For this reason, there is a high likelihood that the correlation value between the received symbol and the new reception signal does not satisfy the predetermined condition, and the signal detection device may fail to detect the arrival of the packet signal or falsely detect the arrival of the packet signal.

The signal detection device having the above structure enables avoiding the above-described problem, since the signal detection device reverts the new reference signal obtained by the reference signal calculation unit to the signal of the signal waveform having the predetermined pattern if the predetermined reset condition is satisfied.

In the signal detection device, the synchronization judgment unit may be further operable to estimate a symbol timing based on the position information of the sections output by the section position detection unit, and the signal detection device may further include: a first correlation unit operable to sequentially obtain correlation values between the reception signal and a signal having a same signal waveform as the plurality of symbols, and output the correlation values; a first section division unit operable to divide the output of the first correlation unit into sections that are each a time period having a fixed length; a first section position detection unit operable to detect, for each of the sections, a correlation value that satisfies the predetermined condition from among the correlation values in the section, and output sub-position information indicating a relative position of the detected correlation value in the section; a first synchronization judgment unit operable to detect the arrival of the packet signal and estimate the symbol timing based on the sub-position information of the sections output by the first section position detection unit; and a composite unit operable to composite the symbol timing estimated by the synchronization judgment unit and the symbol timing estimated by the first synchronization judgment unit.

Since the signal detection device described above detects the arrival of packet signals in two routes, even if the arrival of the packet signal cannot be detected in one route, the arrival of a packet signal can be detected in the other route, thus improving the ability of the signal detection device to detect the arrival of a packet signal.

In the signal detection device, among a plurality of received packet signals, a packet signal whose arrival has been detected may be used for obtaining the new reference signal.

In the signal detection device, among a plurality of received packet signals, a packet signal whose arrival has been detected and whose header information is free of detected errors may be used for calculating the new reference signal.

In the signal detection device, among a plurality of received packet signals, a packet signal whose arrival has been detected, and that is entirely free of detected errors may be used for calculating the new reference signal.

In the signal detection device, the reference signal calculation unit may obtain the new reference signal based on a newest received packet signal.

In the signal detection device, the reference signal calculation unit may obtain the new reference signal based on packet signals that include a newest received packet signal and a predetermined number of packet signals in descending order of newness.

In the signal detection device, the reference signal calculation unit may obtain the new reference signal based on a rearmost symbol from among the plurality of symbols added to the head of the received packet signal.

In the signal detection device, the reference signal calculation unit may obtain the new reference signal based on symbols that include, among the plurality of symbols added to the head of the received packet signal, a rearmost symbol and a predetermined number of packet signals in descending order.

In the signal detection device, the reference signal calculation unit may obtain the new reference signal based on one of a symbol in a predetermined power range and a symbol in a predetermined amplitude range, from among the plurality of symbols added to the head of the received packet signal.

According to the structures of the signal detection devices described above, the new reference signal obtained by the reference signal calculation unit reflects the channel characteristic etc. as much as possible.

In the signal detection device, the reset condition may be satisfied if a packet signal error is detected in a predetermined number of packets in the packet signal.

In the signal detection device, the reset condition may be satisfied if a header information error is detected in a predetermined number of packets in the packet signal.

In the signal detection device, the reset condition may be satisfied if the reference signal stored in the storage unit is not updated in a predetermined time period.

The signal detection device may further include: an estimation unit operable to measure a reception power level of the reception signal, and to estimate the arrival of the packet signal based on the measured reception power level, wherein the reset condition is satisfied if the synchronization judgment unit cannot detect the arrival of the packet signal in a case that the packet signal has been estimated to arrive a predetermined number of times, and if the reset condition is satisfied, the reset unit updates storage content of the storage unit to reflect a result of the packet signal arrival estimation performed by the estimation unit, and a result of the packet signal arrival detection performed by the synchronization judgment unit.

According to these structures, for example, if an inference is made that a reference signal has been obtained by mistake by the reference signal calculation unit, or an inference is made that the new reference signal obtained by the reference signal calculation unit does not reflect the channel characteristic, etc., the signal detection device can update the reference signal to the signal whose signal waveform has the predetermined pattern.

BRIEF DESCRIPTION OF THE DRAWINGS

FIGS. 5A to 5D show an exemplary internal signal for illustrating operation of various portions of the signal detection unit of FIG. 4;

FIGS. 10A to 10D show an exemplary internal signal for illustrating operation of various portions of the signal detection unit of FIG. 9;

Figure 1:
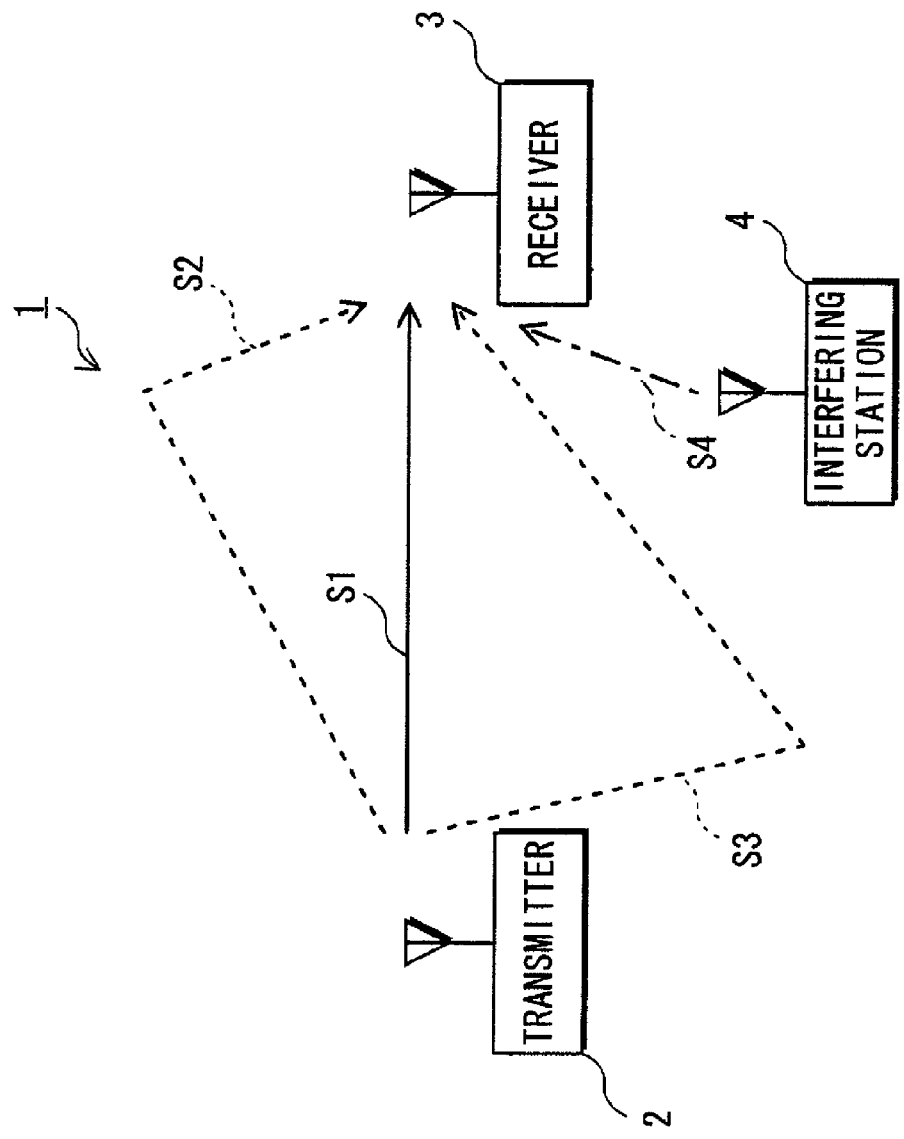
FIG. 1 shows a system structure of a wireless communication system according to embodiment 1.

DESCRIPTION OF THE CHARACTERS 1 wireless communication system
2 transmitter
3 receiver
11 antenna
12 radio frequency analog unit
13 signal detection unit
14 demodulation unit
15 error detection unit
31 reference signal storage unit
32 correlation unit
33 section division unit
34 section position detection unit
35 synchronization judgment unit

BEST MODE FOR CARRYING OUT THE INVENTION

Embodiment 1

The following describes embodiment 1 of the present invention with reference to the drawings.

System Structure

The following describes a system structure of a wireless communication system of the present embodiment with reference to FIG. 1. FIG. 1 shows the system structure of the wireless communication system of the present embodiment. Note that the system structures of the wireless communication systems of other embodiments described later are substantially the same as the system structure of the wireless communication system shown in FIG. 1.

In the present embodiment and embodiments described later, the wireless LAN is compliant with the IEEE 802.11a standard, and the modulation method is an OFDM method used in IEEE 802.11a.

A transmitter 2 and a receiver 3 are included in the wireless communication system 1. Wireless communication is performed between the transmitter 2 and the receiver 3 in the wireless communication system 1.

A packet signal is wirelessly transmitted by the transmitter 2, arrives directly at the receiver 3 (path S1 of FIG. 1), and also arrives at the receiver 3 by reflection and diffraction, etc. (paths S2 and S3 of FIG. 1).

A packet signal wirelessly transmitted by an interfering station 4 arrives at the receiver 3 (path S4 of FIG. 1).

In this way, the receiver 3 receives a desired signal (the packet signal wirelessly transmitted by the transmitter 2), and also receives an interfering signal (the packet signal wirelessly transmitted by the interfering station 4).

Packet Signal

Figure 2:
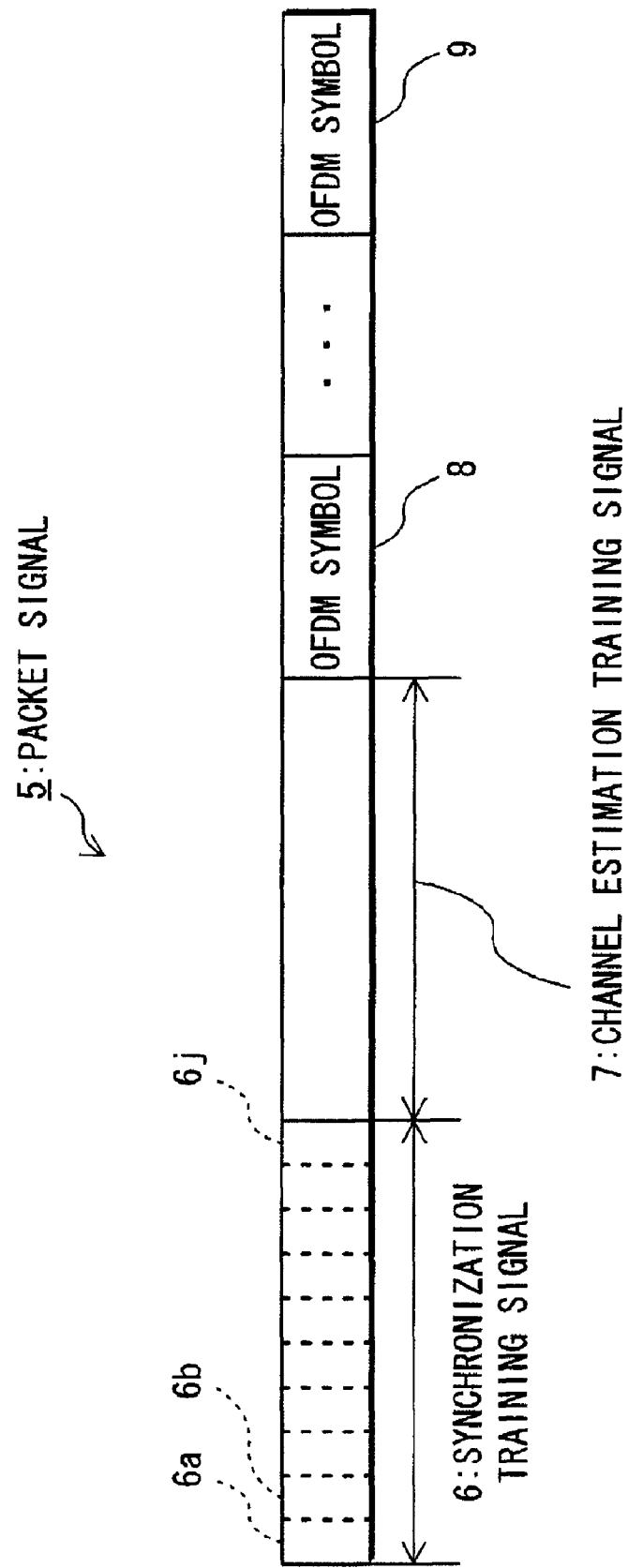
FIG. 2 shows an exemplary format of a packet signal that is transmitted and received in the wireless communication system of FIG. 1.

The following describes, with reference to FIG. 2, a packet signal that is transmitted and received in the wireless communication system 1 of FIG. 1. FIG. 2 shows an exemplary format of the packet signal that is transmitted and received in the wireless communication system 1.

A packet signal 5 includes a synchronization training signal 6, a channel estimation training signal 7, and a plurality of OFDM symbols 8 and 9.

The synchronization training signal 6 is a repeating signal formed by repeating, a plurality of times, short training symbols 6a, 6b, . . . , 6j which are signal waveforms that have a predetermined pattern. According to the IEEE 802.11a standard, the short training symbol is repeated 10 times.

The synchronization training signal 6 is used for detecting an arrival of the packet signal, automatic gain control (AGC), coarse control of carrier frequency errors, estimation of symbol timing, etc., in the receiver.

Note that hereinafter, a short training symbol is referred to simply as a symbol.

The channel estimation training signal 7 includes, for example, a long training symbol that is a signal waveform having a predetermined pattern.

The channel estimation training signal 7 is used for fine control of carrier frequency errors, estimation of the channel, etc.

The OFDM symbols 8 and 9 store, for example, data of information to be transmitted, packet lengths of packet signals, addresses of devices that are sources or destinations of packet signal transmission, and error detection code used for checking whether the packet signal has been demodulated correctly.

Device Structure of Receiver

Figure 3:
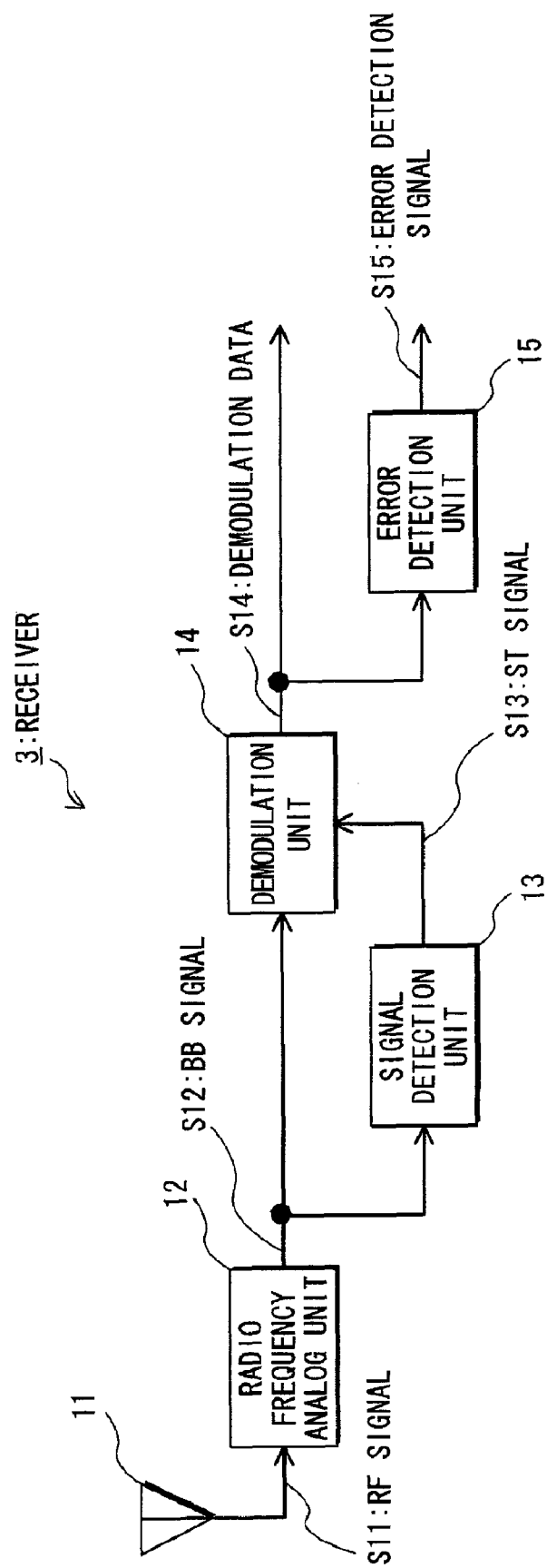
FIG. 3 shows a device structure of a receiver of FIG. 1.

The following describes the device structure of the receiver 3 of FIG. 1 with reference to FIG. 3. FIG. 3 shows the device structure of the receiver 3 of FIG. 1.

The receiver 3 includes an antenna 11, a radio frequency analog unit 12, a signal detection unit 13, a demodulation unit 14, and an error detection unit 15. A radio frequency signal (hereinafter called an RF signal) S11 received via the antenna 11 is input to the radio frequency analog unit 12.

The radio frequency analog unit 12 downconverts the RF signal S11 input by the antenna 11, and outputs a baseband signal (hereinafter referred to as a BB signal) S12 obtained as a result of the downconversion to the signal detection unit 13 and the demodulation unit 14.

The signal detection unit 13 sequentially obtains correlation values between the BB signal S12 input by the radio frequency analog unit 12 and a reference signal, and based on the obtained correlation values, detects the arrival of a packet signal, estimates symbol timings and so on. The signal detection unit 13 outputs, to the demodulation unit 14, a symbol timing signal (hereinafter referred to as an ST signal) S13 that indicates the estimated symbol timing. The reference signal is a known signal that has the same signal waveform as the symbol at the time that the symbol, which has a signal waveform of a predetermined pattern, was added to the head of the packet signal on the transmission side.

The demodulation unit 14 demodulates OFDM symbols in the packet signal in accordance with a symbol timing indicated by an ST signal 313 input by the signal detection unit 13. The demodulation unit 14 outputs demodulated demodulation data S14 to a processing circuit (not depicted) at a subsequent stage and the error detection unit 15.

The error detection unit 15 performs error detection on the demodulation data, and outputs an error detection signal indicating a result of the detection to the processing circuit (not depicted) at a subsequent stage.

Functional Structure of Signal Detection Unit

Figure 4:
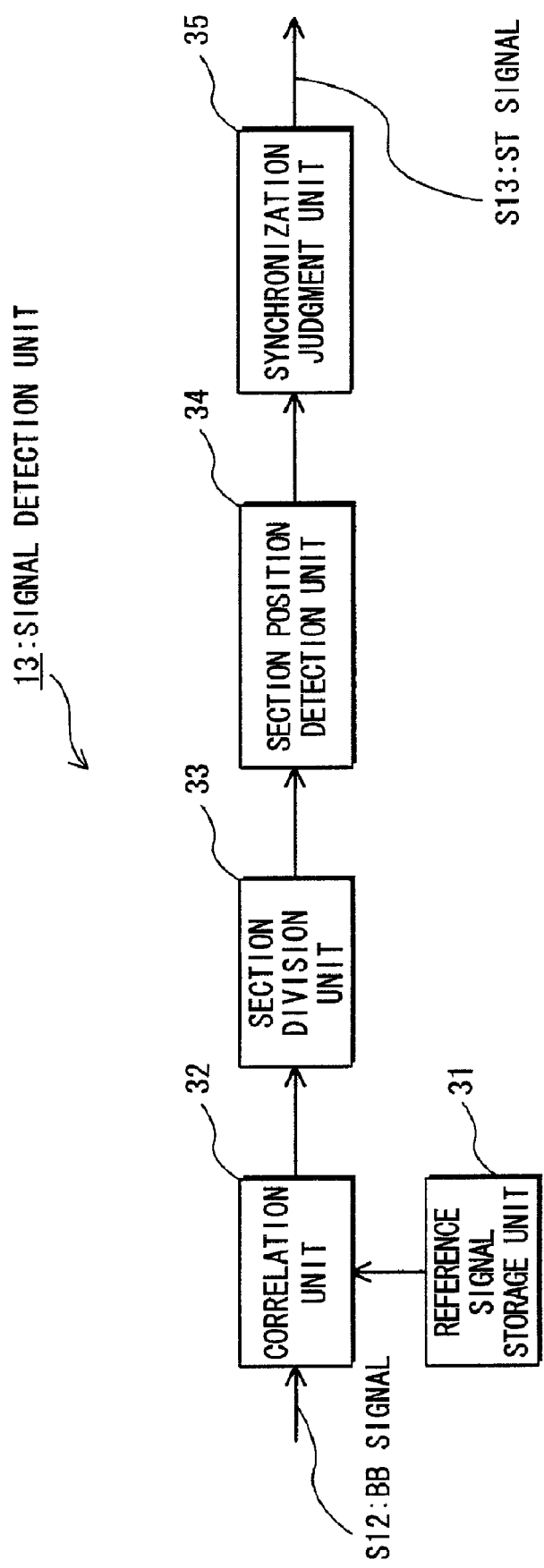
FIG. 4 shows a functional structure of a signal detection unit of FIG. 3.

The following describes a functional structure of the signal detection unit 13 of FIG. 3 with reference to FIGS. 4 to 6. FIG. 4 shows the functional structure of the signal detection unit 13 of FIG. 3. FIG. 5 shows an exemplary internal signal for illustrating operation of various units of the signal detection unit 13 of FIG. 4. FIG. 6 illustrates the operation of a section position detection unit 34 of FIG. 4.

The signal detection unit 13 includes a reference signal storage unit 31, a correlation unit 32, a section division unit 33, the section position detection unit 34, and a synchronization judgment unit 35.

The reference signal storage unit 31 pre-stores the reference signal, and outputs the pre-stored reference signal to the correlation unit 32. The reference signal stored in the reference signal storage unit 31 is the known signal that has the same signal waveform as the symbol when the symbol is added to the head of the packet signal on the transmission side.

The correlation unit 32 sequentially obtains correlation values between the BB signal S12 input by the radio frequency analog unit 12 and the reference signal input by the reference signal storage unit 31, and outputs the obtained correlation values to the section division unit 33.

Specifically, the reference signal storage unit 31 and the correlation unit 32 include an FIR (Finite Impulse Response) filter whose tap coefficient is a complex conjugate of the reference signal. When the BB signals S12 pass through the filter, the filter outputs the correlation values between the BB signals S12 and the reference signal.

FIG. 5A shows an exemplary signal waveform of an input signal input to the correlation unit 32. The input signal is the BB signal S12 that is obtained by downconverting the reception signal. Correlation values between the input signals shown in the example of FIG. 5A and the reference signal are sequentially obtained by the correlation unit 32, and the correlation values shown in the example of FIG. 5B are output by the correlation unit 32. Note that in FIGS. 5B and 5C, the sizes of the correlation values at each position are indicated by the length of the lines. A large correlation value is represented by a long line, and a small correlation value is represented by a short line.

The section division unit 33 divides the output of the correlation unit 32 into fixed time periods. Each fixed time period is a symbol time period. Also, the number of correlation values output during one of the fixed time periods is 16, for example. Note that when dividing the output of the correlation unit 32 into the fixed time periods, no particular consideration need be given to determining the initial timing, and an arbitrary timing may be used as an initial timing.

The section division unit 33 divides the output of the correlation unit 32 shown in the example of FIG. 5B into the symbol time periods shown in the example of FIG. 5C. Each of the portions divided by dotted lines in FIG. 5C corresponds to one of the sections obtained when the section division unit 33 divided the output of the correlation unit 32 into the symbol time periods.

For each section divided into a symbol time period by the section division unit 33, the section position detection unit 34 detects a largest correlation value from among the correlation values in the section. For each section, the section position detection unit 34 outputs first position information to the synchronization judgment unit 35. The first position information indicates a relative position in the section of the detected largest correlation value.

Sequential numbers are assigned to each position in the section, and the numbers assigned to the positions are used as information indicating relative positions of the correlation values in the section. For example, the numbers "1", "2", "3", . . . , "15", and "16" are assigned to the positions in each section in order from the position of the oldest correlation value in the section to the position of the newest correlation value in the section.

After the output of the correlation unit 32 has been divided into sections, as shown in the example of FIG. 5C, the section position detection unit 34 outputs first position information to the synchronization judgment unit 35. The first position information indicates the position of the largest correlation value in each section, which is depicted by either a solid line or a dotted line in FIG. 5D.

Furthermore, the processing performed by the section position detection unit 34 is described below with reference to FIGS. 6A and 6B. To simplify the description, the number of correlation values in one section is five in FIGS. 6A and 6B. Note that in FIG. 6A, the size of the correlation values at each position is indicated by the length of the lines. A large correlation value is represented by a long line, and a small correlation value is represented by a short line.

Figure 6A:
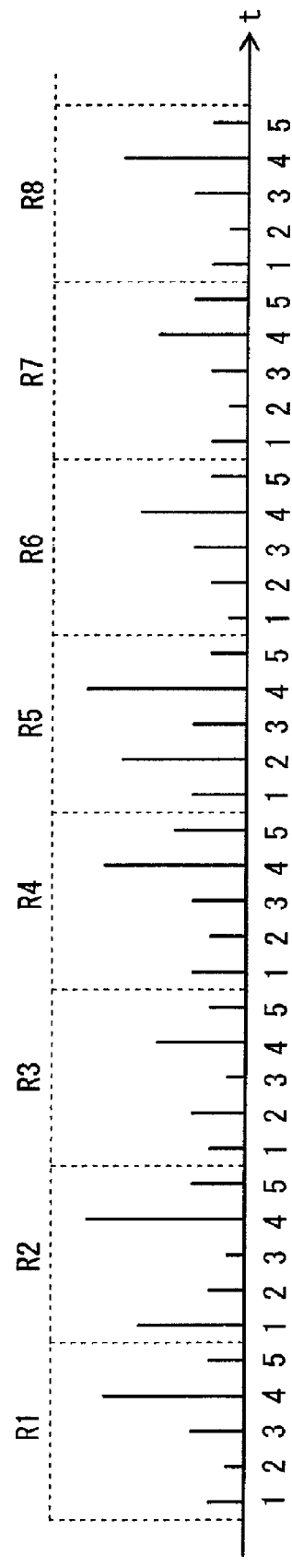
FIGS. 6A and 6B illustrate operation of a section position detection unit of FIG. 4.
Figure 6B:
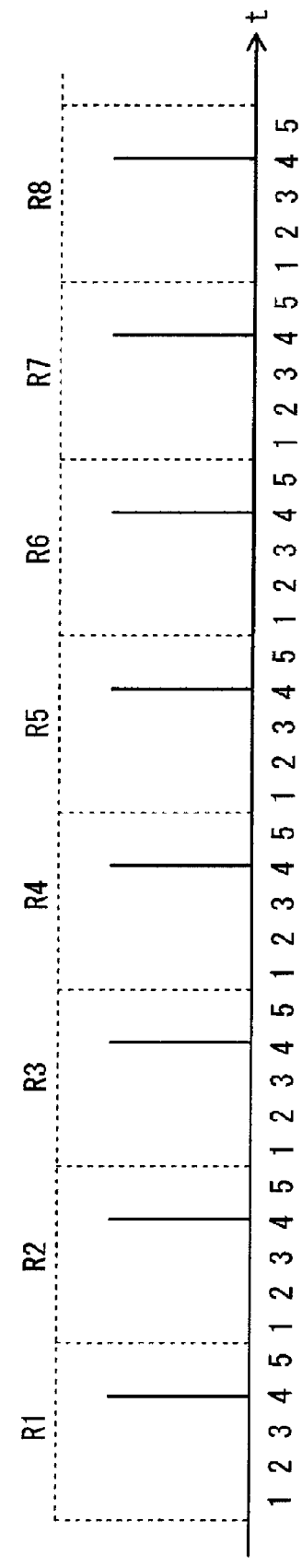

As shown in the example of FIG. 6A, when the output of the correlation unit 32 has been divided into symbol time periods by the section division unit 33, for each section, the first position information that indicates the position depicted by the line in FIG. 6B is output by the section position detection unit 34 to the synchronization judgment unit 35.

For example, in section R5, since the correlation value at position "4" is the largest, the first position information indicating position "4" is output from the section position detection unit 34 to the synchronization judgment unit 35.

The synchronization judgment unit 35 detects the arrival of the packet signal based on the first position information of each section input by the section position detection unit 34.

If the position indicated by the first position information is the same in at least a predetermined number of consecutive sections (in the present embodiment, 4), the synchronization judgment unit 35 judges that the packet signal has arrived. Upon judging that the packet signal has arrived, the synchronization judgment unit 35 estimates the symbol timing based on the first position information, and outputs the ST signal S13 indicating the estimated symbol timing to the demodulation unit 14.

Note that when the predetermined number of consecutive sections is large, there is a higher likelihood of the arrival of a packet signal being overlooked, and when the predetermined number of consecutive sections is small, there is a higher possibility of a packet signal being falsely detected. In light of this, the predetermined number of consecutive sections should be determined with consideration to the number of times the symbol repeats.

Functional Structure of Demodulation Unit

Figure 7:
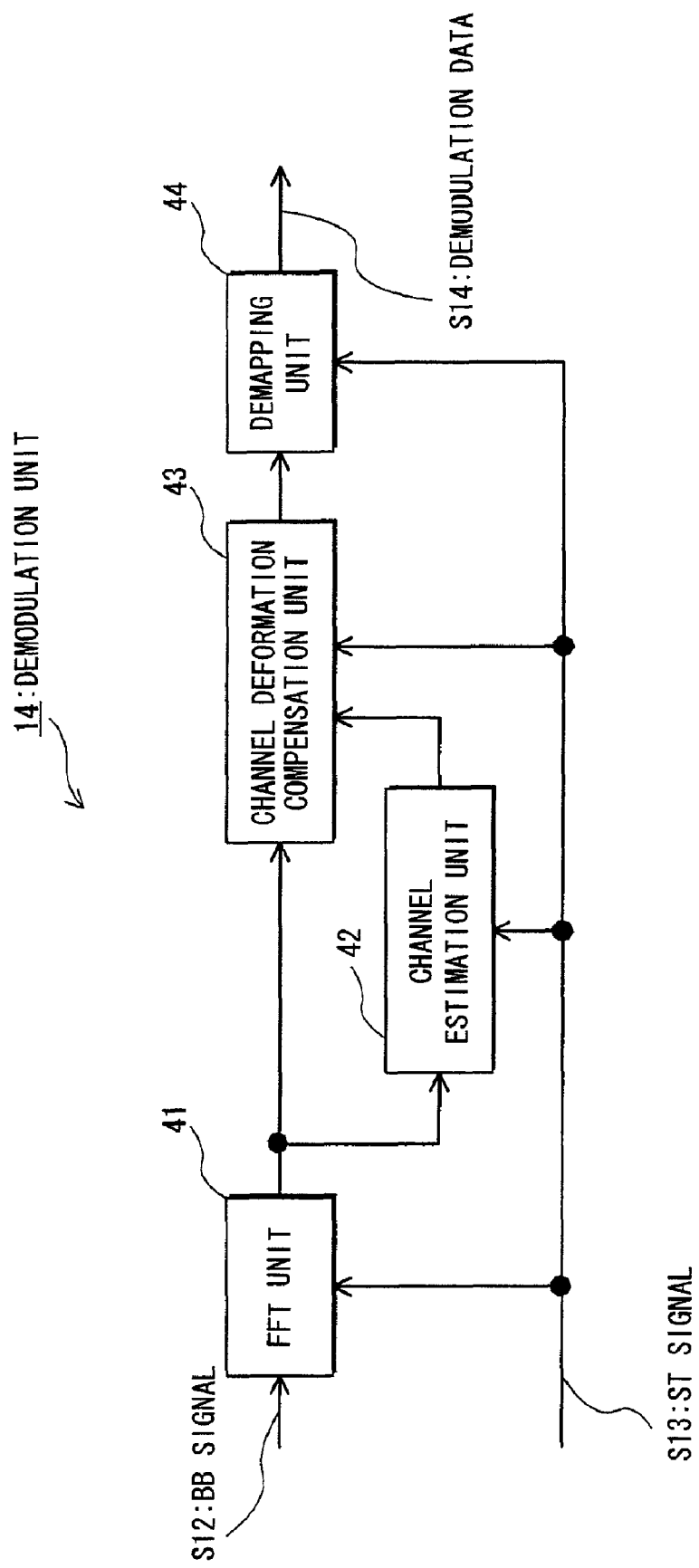
FIG. 7 shows a functional structure of a demodulation unit of FIG. 3.

The following describes a functional structure of the demodulation unit 14 of FIG. 3 with reference to FIG. 7. FIG. 7 shows a functional structure of the demodulation unit 14 of FIG. 3.

The demodulation unit 14 includes an FFT unit 41, a channel estimation unit 42, a channel deformation compensation unit 43, and a demapping unit 44. The ST signal S13 output by the signal detection unit 13 is input to the FFT unit 41, the channel estimation unit 42, the channel deformation compensation unit 43, and the demapping unit 44, respectively.

By performing FFT (Fast Fourier Transform) processing, the FFT unit 41 converts time-domain OFDM symbols in the packet signal into signals in the frequency domain. Since the channel estimation training signal 6 of the packet signal 5 is composed of a plurality of OFDM symbols, the FFT unit 41 also targets the channel estimation training signal 6 for processing.

The channel estimation unit 42 estimates a channel in accordance with the channel estimation training signal 6 that has been converted by the FFT unit 41 into a signal in the frequency domain.

In accordance with the result of the estimation of the channel by the channel estimation unit 42, the channel deformation compensation unit 43 compensates for deformations in the channel of the OFDM symbols 8 and 9, which have been converted into signals in the frequency domain.

After the channel deformation compensation unit 43 has compensated for deformation in the channel of the frequency-domain signals, the demapping unit 44 performs demapping processing on each subcarrier signal in the frequency-domain signals, and outputs demodulated data S14 to a processing circuit (not depicted) at a subsequent stage and the error detection unit 15, respectively.

Signal Detection Operation of Signal Detection Unit

Figure 8:
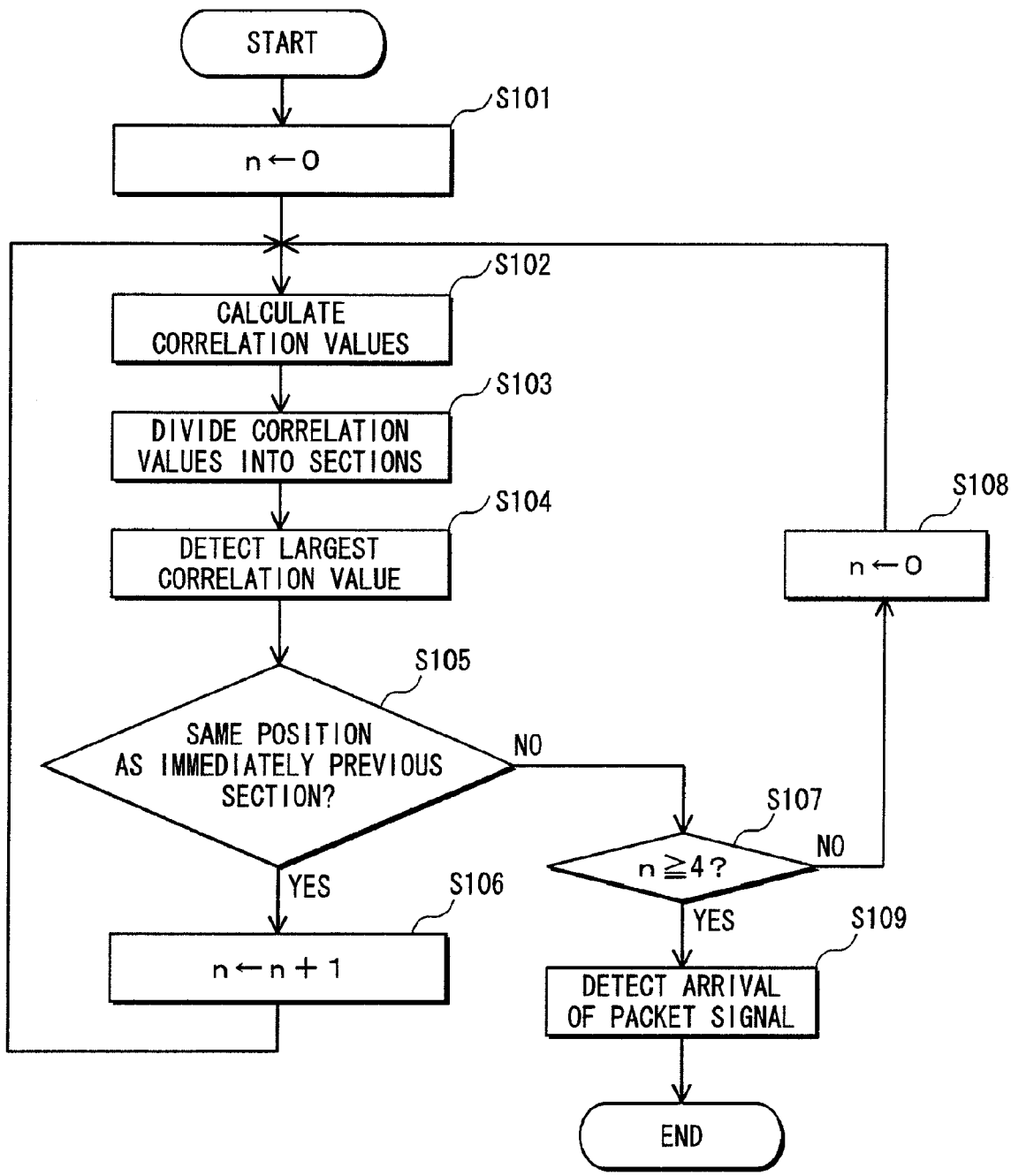
FIG. 8 is a flowchart showing processing procedures of signal detection processing performed by the signal detection unit of FIG. 4.

The following describes signal detection processing performed by the signal detection unit 13 of FIG. 4 with reference to FIG. 8. FIG. 8 is a flowchart showing processing procedures of the signal detection processing performed by the signal detection unit 13 of FIG. 4.

The synchronization judgment unit 35 sets a value of a variable n to "0" (step S101).

The correlation unit 32 obtains correlation values between the BB signal S12 input by the radio frequency analog unit 12 and the reference signal stored by the reference signal storage unit 31, and outputs the obtained correlation values to the section division unit 33 (step S102).

The section division unit 33 divides the output of the correlation unit 32 into symbol time periods (step S103).

After the output of the correlation unit 32 has been divided into symbol time periods by the section division unit 33, the section position detection unit 34 detects the largest correlation value from among the correlation values of the divided sections. The section position detection unit 34 outputs first position information indicating a relative position of the detected largest correlation value in the section to the synchronization judgment unit 35 (step S104).

The synchronization judgment unit 35 judges whether the position indicated by the first position information pertaining to the newest section is the same as the position indicated by the first position information pertaining to the immediately previous section (step S105).

If the positions indicated by the first position information of both sections are the same (step S105:YES), the synchronization judgment unit 35 increases the value of the variable n by one (step S106), and the processing from step S102 onward is performed.

If the positions indicated by the first position information of both sections are not the same (step S105:NO), the synchronization judgment unit 35 judges whether the value of the variable n is greater than or equal to the number of consecutive sections "4" (step S107).

If the value of the variable n is less than the number of consecutive sections "4" (step S107:NO), the synchronization judgment unit 35 sets the variable n to 0 (step S108), and processing from step S102 onward is performed.

If the value of the variable n is greater than or equal to the number of consecutive sections "4" (step S107:YES), the synchronization judgment unit 35 judges that a packet signal has arrived. In other words, the synchronization judgment unit 35 detects the arrival of the packet signal (step S109).

Embodiment 2

The following describes embodiment 2 of the present invention with reference to the drawings.

In embodiment 1, the positions of the largest correlation value in each section resulting from time segmenting performed by the section division unit 33 are used for detecting the arrival of the packet signal.

In contrast, in the present embodiment, positions of any correlation value larger than a threshold in each section resulting from time segmenting performed by the section division unit 33 are used for detecting the arrival of the packet signal.

Functional Structure of Signal Detection Unit

Figure 9:
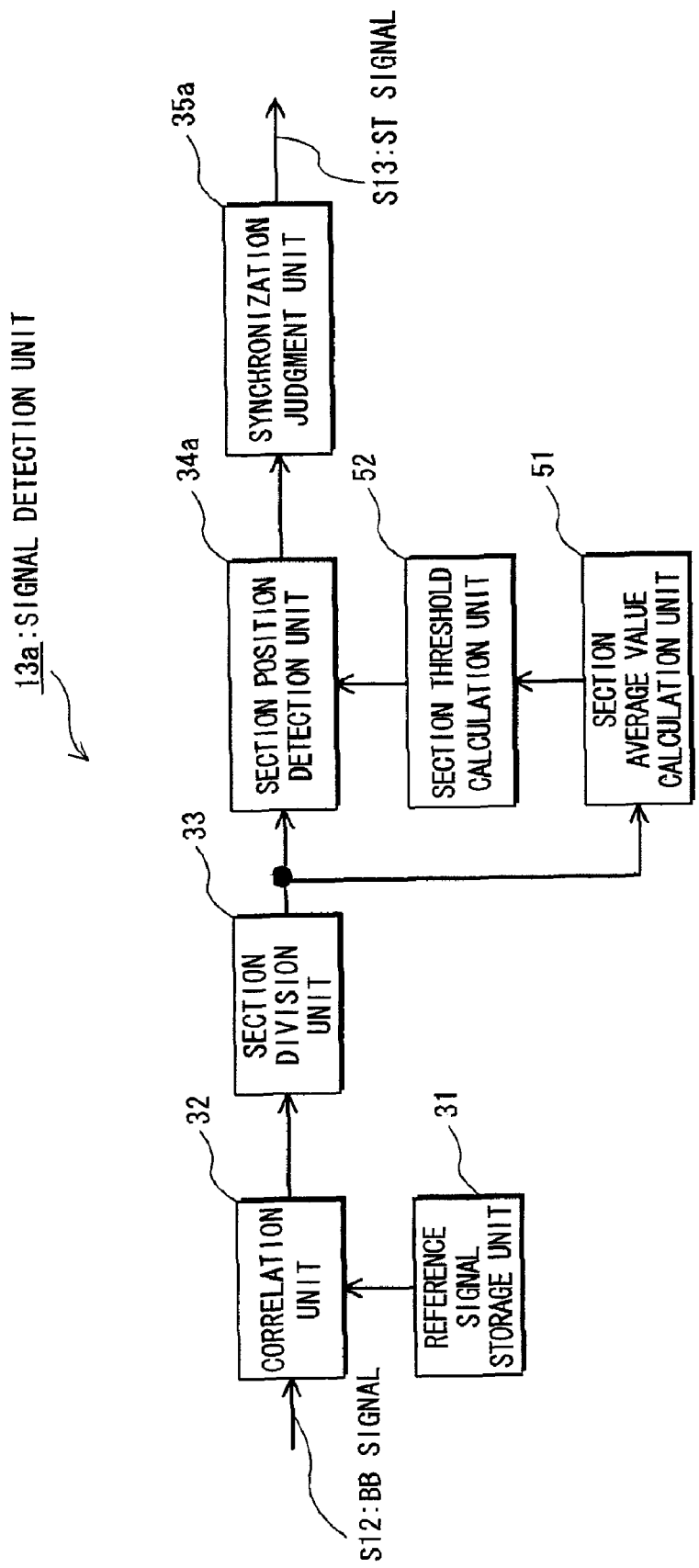
FIG. 9 shows a functional structure of a signal detection unit according to embodiment 2.

The following describes the functional structure of a signal detection unit 13a of the present embodiment with reference to FIGS. 9 to 11. FIG. 9 is a functional structure diagram of the signal detection unit 13a of the present embodiment. FIGS. 10A to 10D show an exemplary internal signal for illustrating operation of various portions of the signal detection unit 13a of FIG. 9. FIG. 11 illustrates the operation of the section position detection unit of FIG. 9.

In the present embodiment, structural elements having the same functions as those in embodiment 1 have been given the same reference symbols, and since the description in embodiment 1 is applicable, such description is omitted in the present embodiment.

The signal detection unit 13a includes the reference signal storage unit 31, the correlation unit 32, the section division unit 33, a section average value calculation unit 51, a section threshold calculation unit 52, a section position detection unit 34a, and a synchronization judgment unit 35a. Note that FIG. 10A shows an exemplary input signal of the correlation unit 32, FIG. 10B shows exemplary correlation values output by the correlation unit 32, and FIG. 10C shows an example of section division performed by the section division unit 33. Note that in FIGS. 10B and 10C, the size of the correlation values at each position is indicated by the length of the lines. A large correlation value is represented by a long line, and small correlation value is represented by a short line.

For each section resulting from the section division performed by the section division unit 33, the section average value calculation unit 51 calculates an average value of correlation values in the section.

For each section resulting from the section division performed by the section division unit 33, the section threshold calculation unit 52 obtains a threshold by multiplying a fixed coefficient by the average value of the section calculated by the section average value calculation unit 51. The section threshold calculation unit 52 sets the threshold calculated for each section in the section position detection unit 34a. For example, the dashed-dotted lines in FIG. 10C indicate various thresholds calculated by the section threshold calculation unit 52. Note that the fixed coefficient can be determined by experimental verification, for example.

For each section resulting from the division into symbol time periods performed by the section division unit 33, the section position detection unit 34a compares each of the correlation values of the section to the threshold of the section, and detects any correlation values that exceed the threshold. For each of the sections, the section position detection unit 34a outputs, to the synchronization judgment unit 35a, second position information indicating a relative position in the section of each of the detected correlation values exceeding the threshold.

As shown in the example of FIG. 10C, when the output of the correlation unit 32 has been divided into sections and a threshold has been set, the section position detection unit 34a outputs second position information for each section to the synchronization judgment unit 35a. The second position information indicates a position, depicted by lines in FIG. 10D, at which a correlation value in the section exceeds the threshold.

Figure 11A:
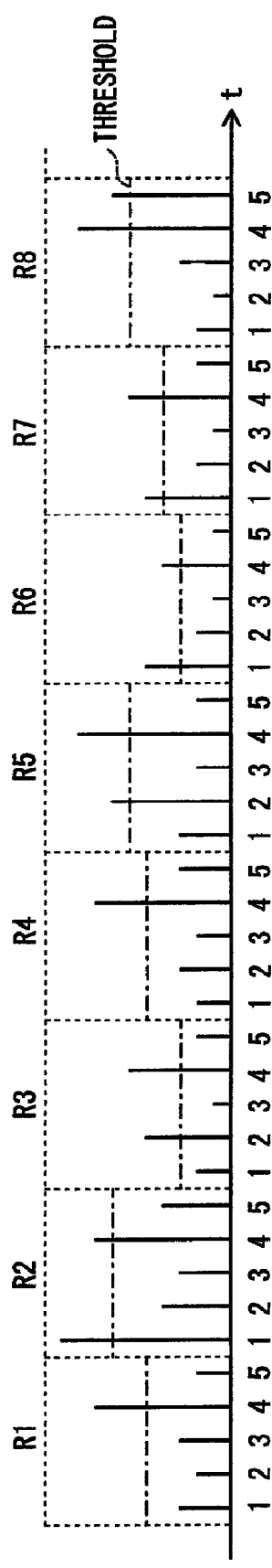
FIGS. 11A and 11B illustrate operation of a section position detection unit of FIG. 9.
Figure 11B:
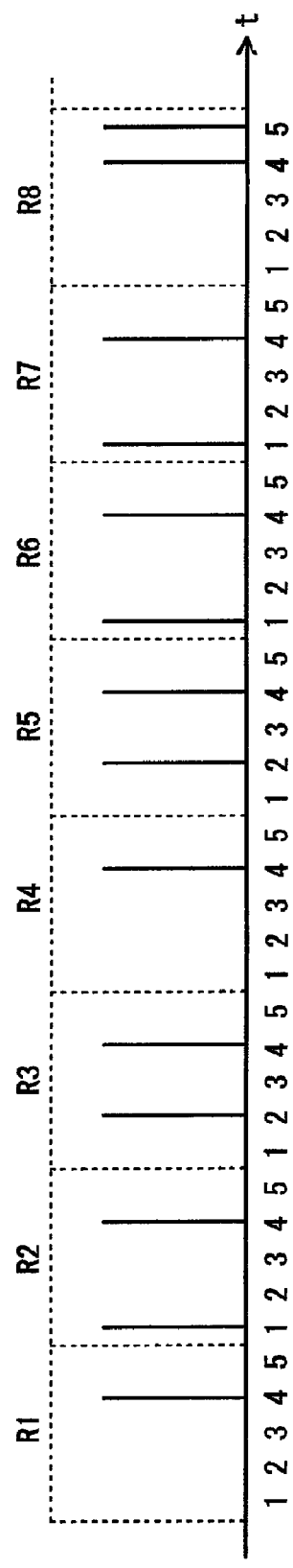

Furthermore, the following describes, with reference to FIG. 11, processing performed by the section position detection unit 34a. In FIGS. 11A and 11B, to simplify the description, the number of correlation values in one section is five. Note that in FIG. 11A, the size of the correlation values of each position is indicated by the length of the lines. A large correlation value is represented by a long line, and a small correlation value is represented by a short line.

As shown in the example of FIG. 11A, when the output of the correlation unit 32 has been divided into symbol time periods by the section division unit 33 and a threshold has been set by the section threshold calculation unit 52, the section position detection unit 34a outputs, for each section, second position information indicating a position, depicted by a line in FIG. 11B, to the synchronization judgment unit 35a.

For example, in the section R5, since correlation values in the positions "2" and "4" exceed the threshold, second position information indicating the positions "2" and "4" is output from the section position detection unit 34a to the synchronization judgment unit 35a.

In FIG. 11B, suppose that position "4" is a position corresponding to an arrival timing of the symbol, and in section R6, the correlation value at position "1" is larger than the correlation value at position "4". However, the second position information that the section position detection unit 34a outputs to the synchronization judgment unit 35a indicates both position "1" and position "4". This enables the synchronization judgment unit 35a to use position "4" of section R6 that corresponds to the arrival timing of the symbol for detecting the arrival of the packet signal.

The synchronization judgment unit 35a detects the arrival of the packet signal based on the second position information of each section input by the section position detection unit 34a.

If any of the positions indicated by the second position information are the same in greater than or equal to a predetermined consecutive section number (4 in the present embodiment), the synchronization judgment unit 35a judges that the packet signal has arrived. Upon judging that the packet signal has arrived, the synchronization judgment unit 35a estimates the symbol timing based on the second position information, and outputs the ST signal S13 that indicates the estimated symbol timing to the demodulation unit 14.

Signal Detection Operation of the Signal Detection Unit

Figure 12:
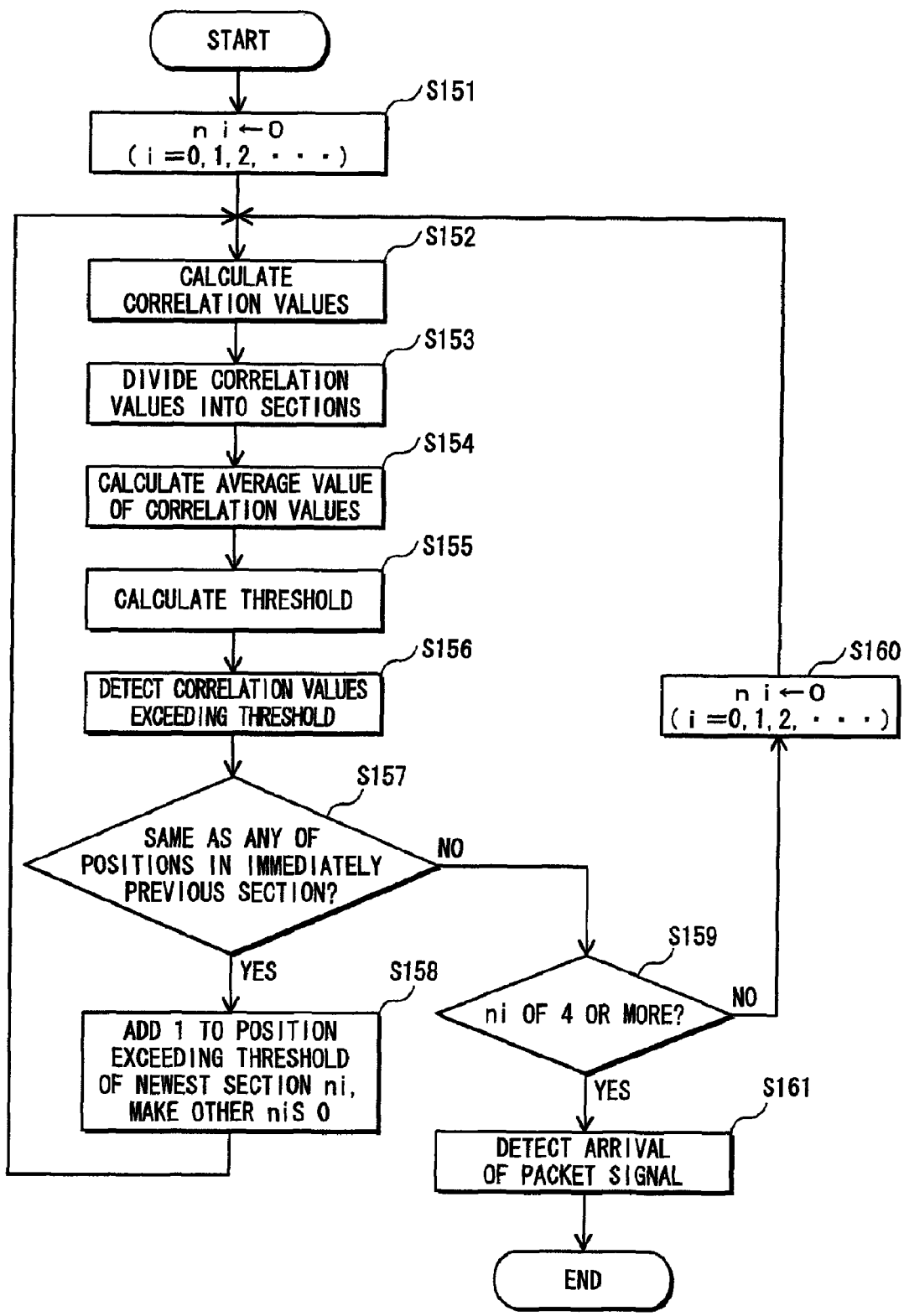
FIG. 12 is a flowchart showing processing procedures of signal detection processing performed by the signal detection unit of FIG. 9.

The following describes signal detection processing performed by the signal detection unit 13a of FIG. 9 with reference to FIG. 12. FIG. 12 is a flowchart showing processing procedures of signal detection processing performed by the signal detection unit 13a of FIG. 9.

The synchronization judgment unit 35a sets all of the variables ni (i=1, 2 . . . ) to 0 (step S151). The variables ni are provided separately for each position.

The correlation unit 32 obtains correlation values between the BB signal S12 input by the radio frequency analog unit 12 and a reference signal stored in the reference signal storage unit 31, and outputs the obtained correlation values to the section division unit 33 (step S152).

The section division unit 33 divides the output of the correlation unit 32 into symbol time periods (step S153).

After the output of the correlation unit 32 has been divided into symbol time periods by the section division unit 33, the section average value calculation unit 51 calculates an average value of the correlation values in the section (step S154). Then, the section threshold calculation unit 52 calculates a threshold by multiplying the calculated average value of the section by a fixed coefficient, and sets the calculated threshold in the section position detection unit 34a (step S155).

The section position detection unit 34a compares each correlation value in the section to the set threshold, and detects correlation values that exceed the threshold. Then, the section position detection unit 34a outputs, to the synchronization judgment unit 35a, second position information indicating relative positions in the section of each of the detected correlation values that exceed the threshold (step S156).

The synchronization judgment unit 35a judges whether any of the positions indicated by the second position information pertaining to the newest section match any of the positions indicated by the second position information pertaining to the immediately previous section (step S157).

If there is a match (step S157:YES), the synchronization judgment unit 35a adds 1 to the value of the variable ni that corresponds to each of the positions indicated by the second position information pertaining to the newest section (positions in which the correlation value exceeds the threshold). Furthermore, the synchronization judgment unit 35a resets the values of the other variables ni to 0 (step S158). Then, processing from step S152 onward is performed.

If there is not a match (step S157:NO), the synchronization judgment unit 35a judges whether a variable ni exists that has a value greater than or equal to the consecutive section number "4" (step S159).

If a variable ni that has a value greater than or equal to the consecutive section number "4" does not exist (step S159: NO), the synchronization judgment unit 35a sets all of the variables ni (i=1, 2 . . . ) to 0 (step S160), and the processing from step S152 onward is performed.

If a variable ni that has a value greater than or equal to the consecutive section number "4" exists (step S159:YES), the synchronization judgment unit 35a judges that a packet signal has arrived. In other words, the synchronization judgment unit 35a detects the arrival of the packet signal (step S161).

Embodiment 3

The following describes embodiment 3 of the present invention with reference to the drawings.

In embodiment 1, a judgment is made that a packet signal has arrived if the largest correlation value in the section is the same for a predetermined consecutive section number of sections.

In contrast, in the present embodiment, for each section, correlation values at a same position are accumulated over a predetermined accumulation section number of sections. A judgment is made that the packet signal has arrived if the number of matching sections among the predetermined accumulation section number of sections is greater than or equal to a predetermined number of matching sections, each matching section being a section whose position information indicates a same position as the position indicated by the judgment position information.

Functional Structure of Signal Detection Unit

Figure 13:
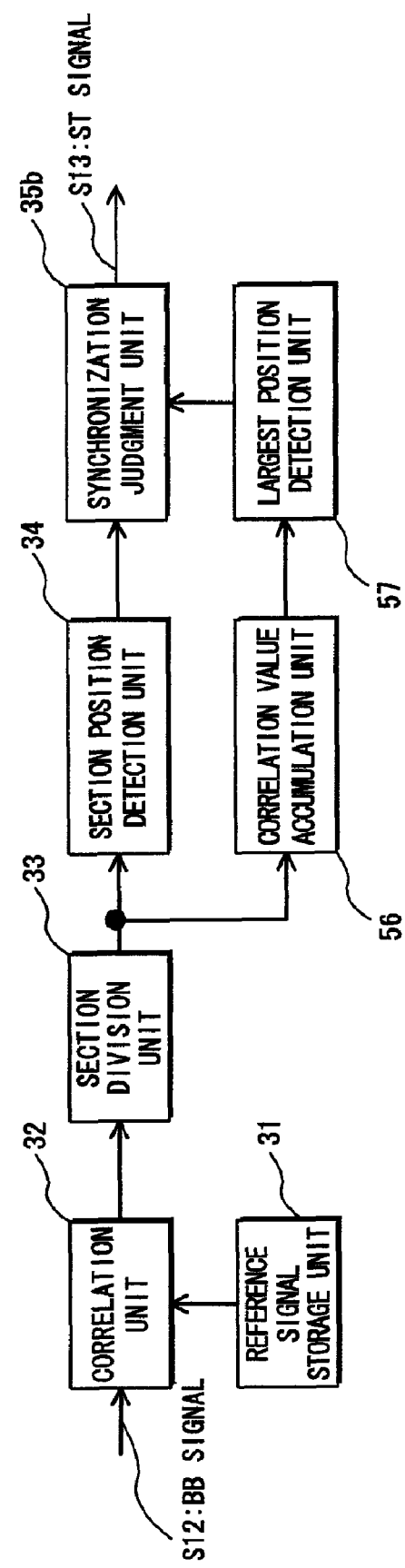
FIG. 13 shows a functional structure of a signal detection unit according to embodiment 3.

The following describes the functional structure of a signal detection unit 13b of the present embodiment with reference to FIG. 13. FIG. 13 shows the functional structure of the signal detection unit 13b of the present embodiment. In the present embodiment, structural elements having the same functions as those in previous embodiments have been given the same reference symbols, and since the description in the previous embodiments is applicable, such description is omitted in the present embodiment.

The signal detection unit 13b includes the reference signal storage unit 31, the correlation unit 32, the section division unit 33, the section position detection unit 34, the correlation value accumulation unit 56, the largest position detection unit 57, and a synchronization judgment unit 35b.

For each relative position, the correlation value accumulation unit 56 accumulates correlation values over the predetermined accumulation section number of consecutive sections, and outputs accumulation values of each of the positions to the largest position detection unit 57. In the present embodiment, the accumulation section number is 10, which is the same as the number of times that the symbol is repeated according to IEEE802.11a standards.

The largest position detection unit 57 detects the largest accumulation value from among the accumulation values input by the correlation value accumulation unit 56, and outputs largest position information indicating a relative position of the detected largest accumulation value to the synchronization judgment unit 35b.

Furthermore, the functions of the correlation value accumulation unit 56 and the largest position detection unit 57 are described below with reference to FIG. 14(a) and (b). FIG. 14(a) and (b) illustrates functions of the correlation value accumulation unit 56 and the largest position detection unit 57 of FIG. 13. To simplify the description, the number of positions in the section is set at 5, and the number of sections over which to accumulate the correlation values is set at 3.

Note that in FIG. 14(a), the size of a correlation value at each position is represented by the length of the line. A large correlation value is represented by a long line, and a small correlation value is represented by a short line. In FIG. 14(b), the size of an accumulation value at each position is indicated by the length of the line. A large accumulation value is represented by a long line, and a small accumulation value is represented by a short line.

In the description below, correlation values of position j (j=1,2,3,4,5) in section Ri (i=1,2,3) are represented as Vij.

The correlation value accumulation unit 56 adds the correlation value V11 of position "1" of section R1, the correlation value V21 of position "1" of section R2, and the correlation value V31 of position "1" of section R3. This is how the correlation value accumulation unit 56 calculates the accumulation value VT1 (=V11+V21+V31) of position "1".

Furthermore, the correlation value accumulation unit 56 calculates correlation values VTj (j=2, 3, 4, 5) of other positions j (j=2, 3, 4, 5) by performing similar processing.

Figure 14:
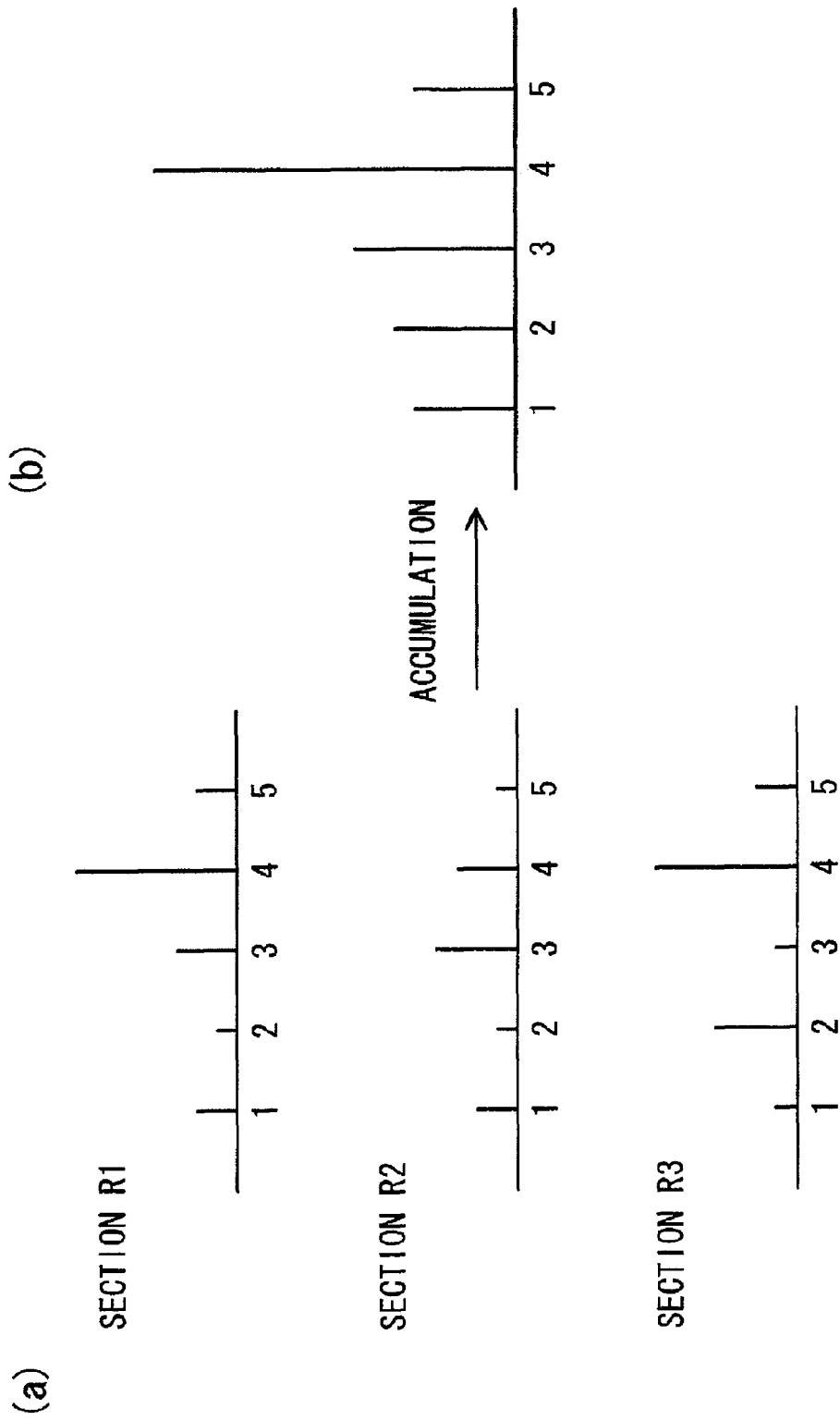
FIGS. 14(a) and (b) illustrates functions of a correlation value accumulation unit and a largest position detection unit of FIG. 13.

The correlation values at positions in each of sections R1, R2, and R3 are as shown in FIG. 14(*a*), and the accumulation values at each of the positions are as shown in FIG. 14(*b*).

Since the accumulation value at position "4" is the largest in FIG. 14(*b*), the largest position detection unit 57 outputs largest position information indicating position "4" to the synchronization judgment unit 35*b*.

The synchronization judgment unit 35*b* detects the arrival of a packet signal based on the first position information of each section input by the section position detection unit 34 and the largest position information input by the largest position detection unit 57.

The synchronization judgment unit 35*b* compares the position indicated by the first position information input by the section position detection unit 34 to the position indicated by the largest position information input by the largest position detection unit 57. The synchronization judgment unit 35*b* judges that the packet signal has arrived if the result of the comparison indicates that a number of sections in which both positions match is greater than or equal to a predetermined threshold section number (7 in the present embodiment), in the accumulation section number "10" of consecutive sections. If a judgment has been made that the packet signal has arrived, the synchronization judgment unit 35*b* estimates the symbol timing based on the first position information, and outputs the ST signal S13 that indicates the estimated symbol timing to the demodulation unit 14.

Signal Detection Operation of the Signal Detection Unit

Figure 15:
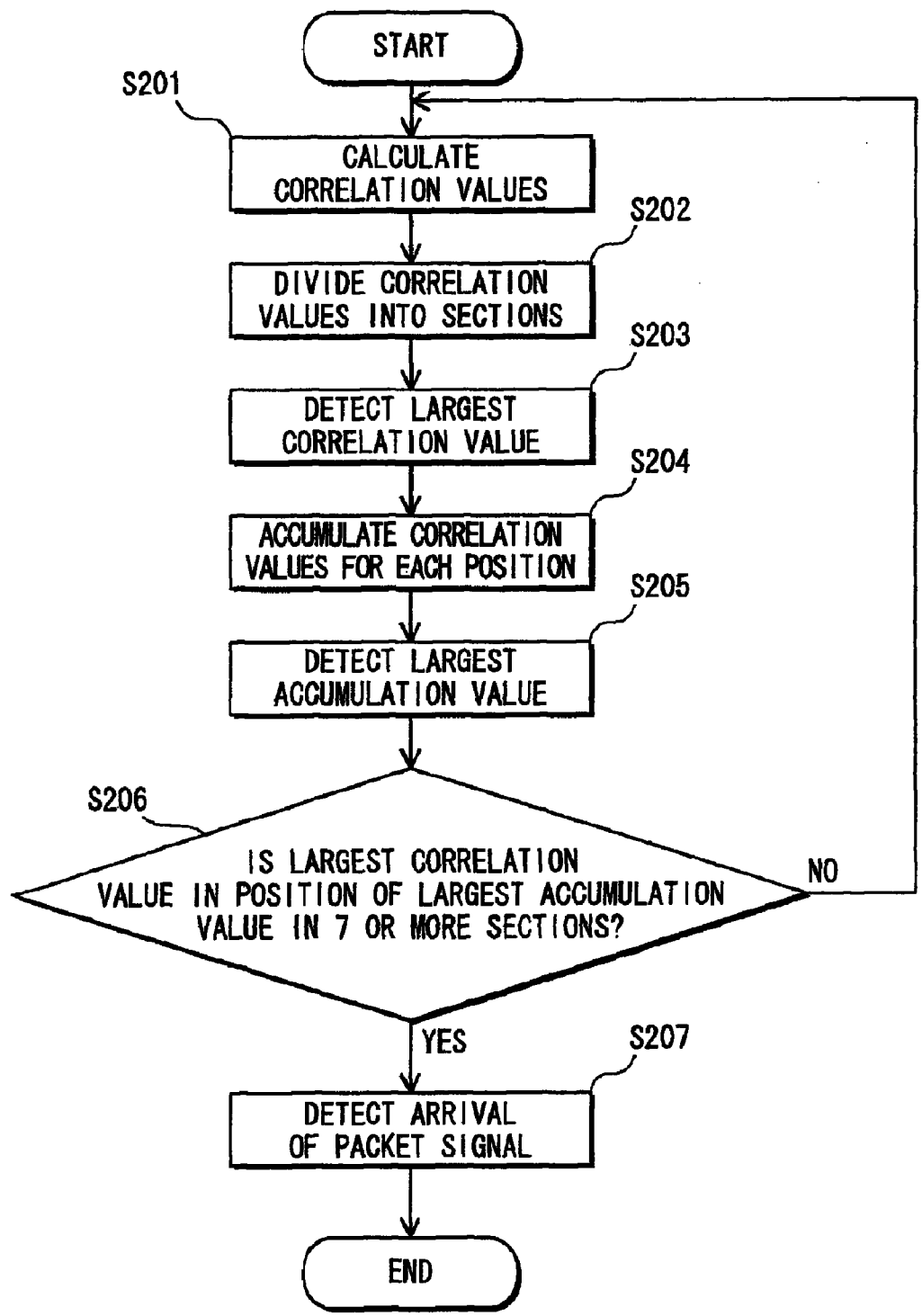
FIG. 15 is a flowchart showing processing procedures of signal detection processing performed by the signal detection unit of FIG. 13.

The following describes signal detection processing performed by the signal detection unit 13*b* of FIG. 13 with reference to FIG. 15. FIG. 15 is a flowchart showing processing procedures of signal detection processing performed by the signal detection unit 13*b* of FIG. 13.

The signal detection unit 13*b* performs substantially the same processing from steps S102 to S104 of FIG. 8 (steps S201 to S203).

For each position, the correlation value accumulation unit 56 accumulates correlation values in the same position over the consecutive accumulation section number of sections "10", and outputs the accumulation result to the largest position detection unit 57 (step S204). Next, the largest position detection unit 57 detects the largest accumulation value from among the accumulation values obtained by the correlation value accumulation unit 56, and outputs the largest position information that indicates the largest accumulation value to the synchronization judgment unit 35*b* (step S205).

For each section, the synchronization judgment unit 35*b* compares the position indicated by the first position information input by the section position detection unit 34 to the position indicated by the largest position information input by the largest position detection unit 57. As a result of the comparison, the synchronization judgment unit 35*b* judges whether a number of sections in which both positions match in the consecutive accumulation section number of "10" sections is greater than or equal to the predetermined threshold section number "7" (step S206).

If the number of sections in which both positions match is not greater than or equal to the threshold section number "7" (step S206:NO), the processing of steps S201 onward is performed.

If the number of sections in which both positions match is greater than or equal to the threshold section number "7" (step S206:YES), the synchronization judgment unit 35*b* judges that a packet signal has arrived. That is, the synchronization judgment unit 35*b* detects the arrival of the packet signal (step S207).

Embodiment 4

The following describes embodiment 4 of the present invention with reference to the drawings.

In embodiment 2, a judgment is made that a packet signal has arrived if correlation values that exceed the threshold in each section are in the same position for a predetermined number of consecutive sections.

In contrast, in the present embodiment, correlation values at the same position are accumulated over a consecutive predetermined accumulation section number of sections. A judgment is made that a packet signal has arrived if a number of sections in which any of the positions of the correlation values that exceed the threshold match the position of the largest accumulation value in the section is greater than or equal to a predetermined threshold in the accumulation section number of sections.

Functional Structure of the Signal Detection Unit

Figure 16:
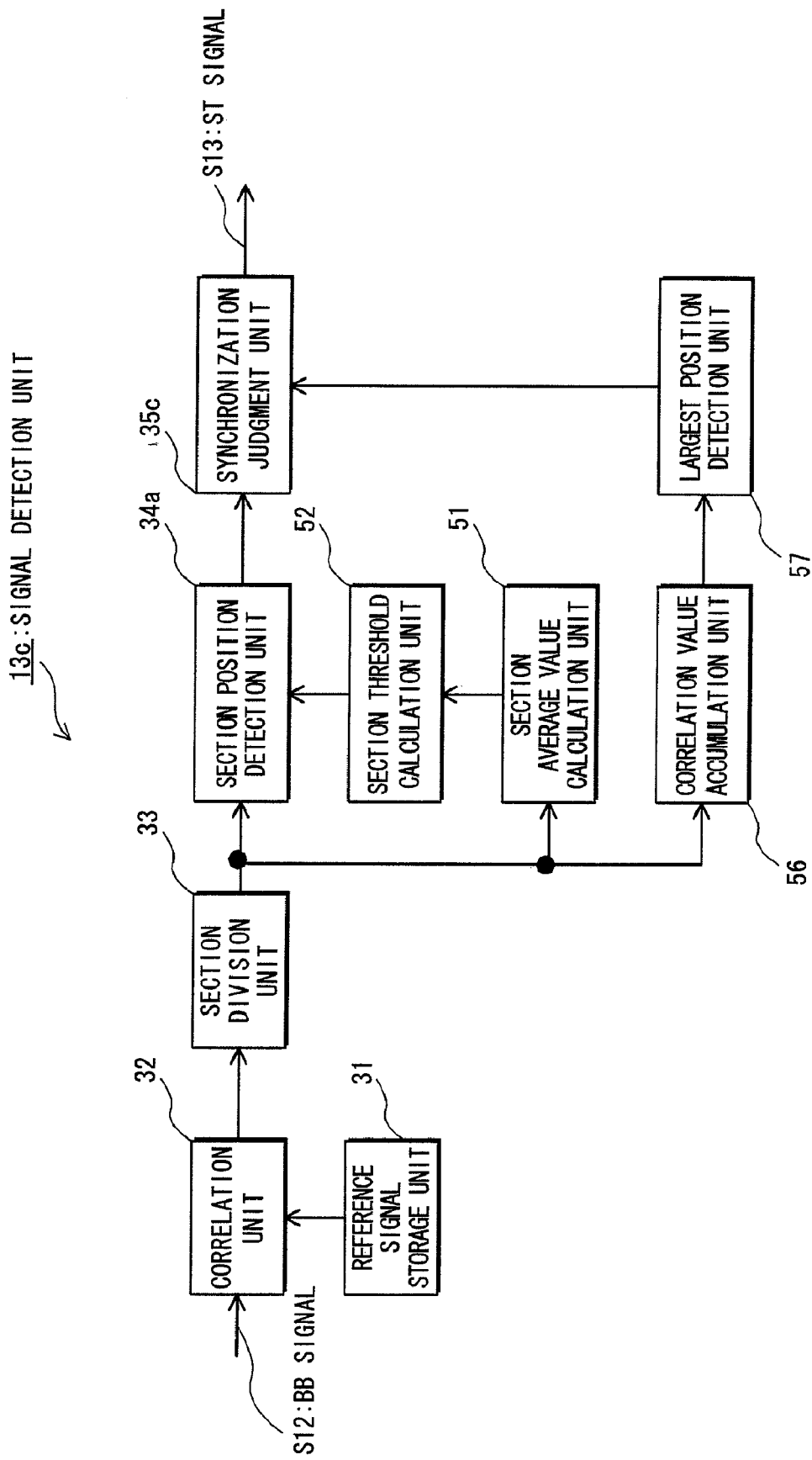
FIG. 16 shows a functional structure of a signal detection unit according to embodiment 4.

The following describes a functional structure of a signal detection unit 13*c* of the present embodiment with reference to FIG. 16. FIG. 16 shows the functional structure of the signal detection unit 13*c* according to the present embodiment. In the present embodiment, structural elements having the same functions as those in previous embodiments have been given the same reference symbols, and since the description in previous embodiments is applicable, such description is omitted in the present embodiment.

The signal detection unit 13*c* includes the reference signal storage unit 31, the correlation unit 32, the section division unit 33, the section average value calculation unit 51, the section threshold calculation unit 52, the section position detection unit 34*a*, the correlation value accumulation unit 56, the largest position detection unit 57, and a synchronization judgment unit 35*c*.

Substantially the same processing is performed on the BB signal S12 that is input to the signal detection unit 13*c* as in embodiment 2, and second position information for each of the sections is input by the section position detection unit 34*a* to the synchronization judgment unit 35*c*.

Also, substantially the same processing is performed on the BB signal S12 that is input to the signal detection unit 13*c* as in embodiment 3, and the largest position information is input by the largest position detection unit 57 to the synchronization judgment unit 35*c*.

The synchronization judgment unit 35*c* detects the arrival of a packet signal based on the second position information for each section input by the section position detection unit 34*a* and the largest position information input by the largest position detection unit 57.

The synchronization judgment unit 35*c* compares each of the positions indicated by the second position information input by the section position detection unit 34*a* to the position indicated by the largest position information input by the largest position detection unit 57. As a result of the comparison, the synchronization judgment unit 35*c* judges that a packet signal has arrived if a number of matching sections among a consecutive accumulation section number of sections (10 in the present embodiment) is greater than or equal to a threshold section number (7 in the present embodiment), a matching section being a section in which any of the positions indicated by the second position information matches the position indicated by the largest position information. If a judgment has been made that the packet signal has arrived, the synchronization judgment unit 35c estimates a symbol timing in accordance with the second position information, and outputs the ST signal S13 indicating the estimated symbol timing to the demodulation unit 14.

Embodiment 5

The following describes embodiment 5 of the present embodiment with reference to the drawings.

In the present embodiment, the synchronization training symbol of the received packet signal is used for updating the reference signal used for calculating the correlation values.

Note that in embodiment 5 and later-described embodiments, for convenience, the reference signal is referred to as an initial reference signal when said reference signal is a known symbol having the same signal waveform as the symbol at the time that the symbol was added to the head of the packet on the transmission side.

Functional Structure of Signal Detection Unit

Figure 17:
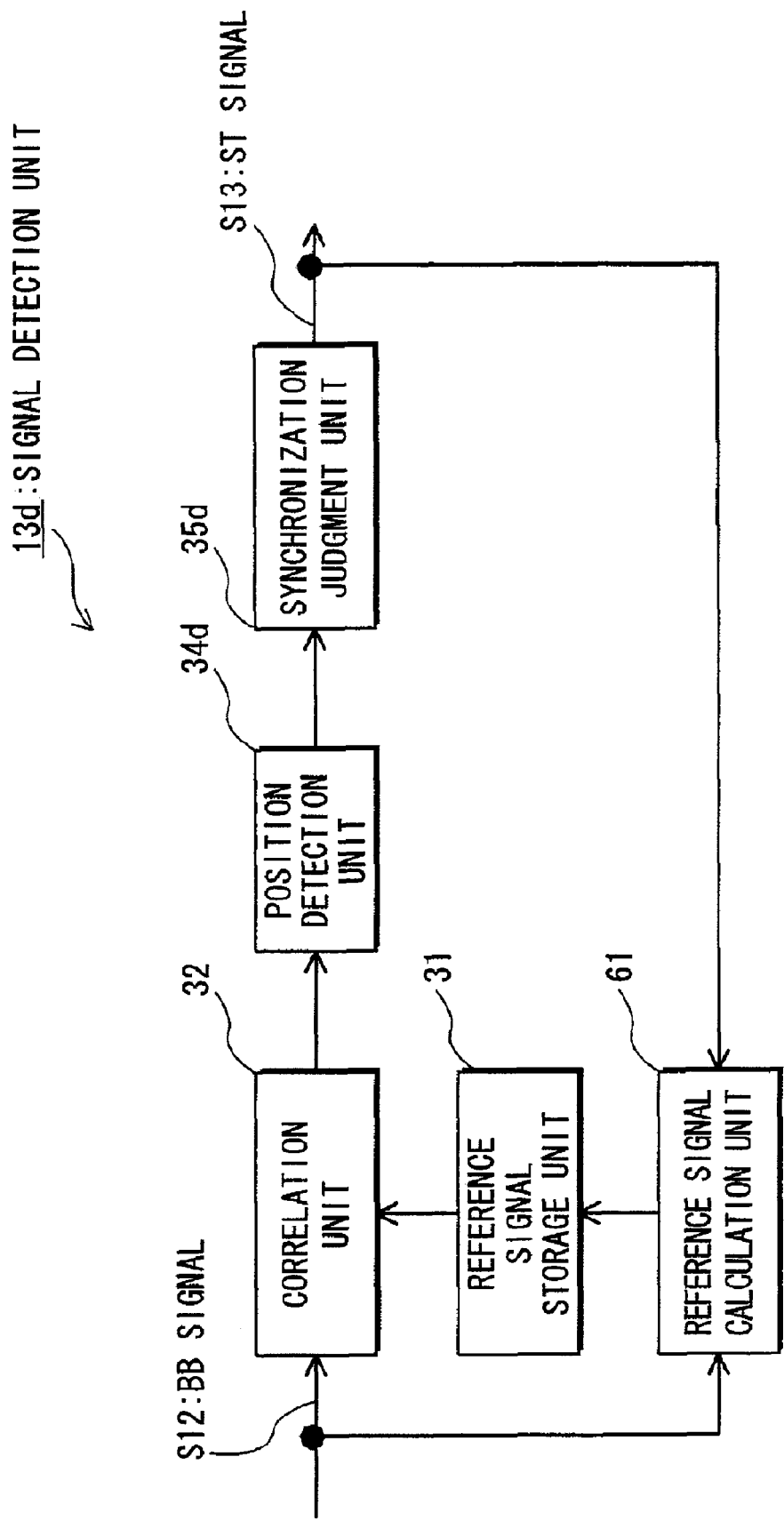
FIG. 17 shows a functional structure of a signal detection unit according to embodiment 5.

The functional structure of the signal detection unit 13d in the present embodiment is described below with reference to FIG. 17. FIG. 17 shows a functional structure of the signal detection unit 13d of the present embodiment. In the present embodiment, structural elements having the same functions as those in previous embodiments have been given the same reference symbols, and since the description in previous embodiments is applicable, such description is omitted in the present embodiment.

The signal detection unit 13d includes the reference signal storage unit 31, the correlation unit 32, a position detection unit 34d, a synchronization judgment unit 35d, and a reference signal calculation unit 61. Note that for example, the reference signal stored in the reference signal storage unit 31 when the power is turned on is the initial reference signal.

The position detection unit 34d compares each of the correlation values input by the correlation unit 32 to a predetermined threshold. As a result of the comparison, the position detection unit 34d detects a correlation value that is larger than a predetermined threshold, and outputs third position information indicating a relative position of the detected correlation value on a time axis.

In accordance with the third position information input by the position detection unit 34d, the synchronization judgment unit 35d judges that a packet signal has arrived if an interval between adjacent positions of correlation values that exceed the threshold is the same as the symbol time period of the symbol over a predetermined threshold interval number (in the present embodiment, 3) of consecutive symbols. The synchronization judgment unit 35d estimates a symbol timing in accordance with the third position information, and outputs the ST signal S13 indicating the estimated symbol timing to the demodulation unit 14 and the reference signal calculation unit 61.

Upon receiving an input of the ST signal S13, the reference signal calculation unit 61 obtains a new reference signal based on the synchronization training signal included in the BB signals S12 input by the radio frequency analog unit 12. The reference signal calculation unit 61 updates the reference signal stored in the reference signal storage unit 31 to the new reference signal.

Note that the detection of a correlation value exceeding the threshold may be set to trigger the reference signal calculation unit 61 to obtain a new reference signal, and in such a case, a correlation value exceeding the threshold even one time triggers obtaining a new reference signal. For this reason, the triggering of obtaining the new reference signal may easily be influenced by an interfering signal or noise, and there is a high likelihood of the new reference signal being obtained in a portion other than the synchronization training signal by mistake.

In contrast, when the input of the ST signal S13, that is, the judgment that the packet signal has arrived, is set as the trigger for obtaining the new reference signal, obtaining the new reference signal is not triggered unless a correlation value in each symbol time period exceeds the threshold a plurality of times. For this reason, the triggering of obtaining the new reference signal is not easily influenced by interference signals or noise, and there is a low likelihood of the new reference signal being obtained in a portion other than the synchronization training signal by mistake.

The reference signal calculation unit 61 sets a rearmost symbol of the synchronization training signal of the newest received packet signal to the new reference signal. Here, the received packet signal in the present embodiment is a packet signal whose arrival has been detected by the synchronization judgment unit 35d.

Note that during a time period from the head of the packet signal to several symbols thereafter, there is a high possibility of the signal being distorted due to AGC pull-in. In contrast, in the rearmost symbol after AGC convergence, there is no signal distortion due to AGC pull-in, and the signal more closely reflects a characteristic of the channel.

Also, providing a simple timing control circuit (not depicted) is sufficient for enabling the reference signal calculation unit 61 to receive the input of the ST signal S13 and to extract the rearmost symbol of the synchronization training signal from the BB signals S12. For this reason, the multiplier is not necessary, and an increase in the amount of circuitry can be suppressed.

Signal Detection Operation of Signal Detection Unit

Figure 18:
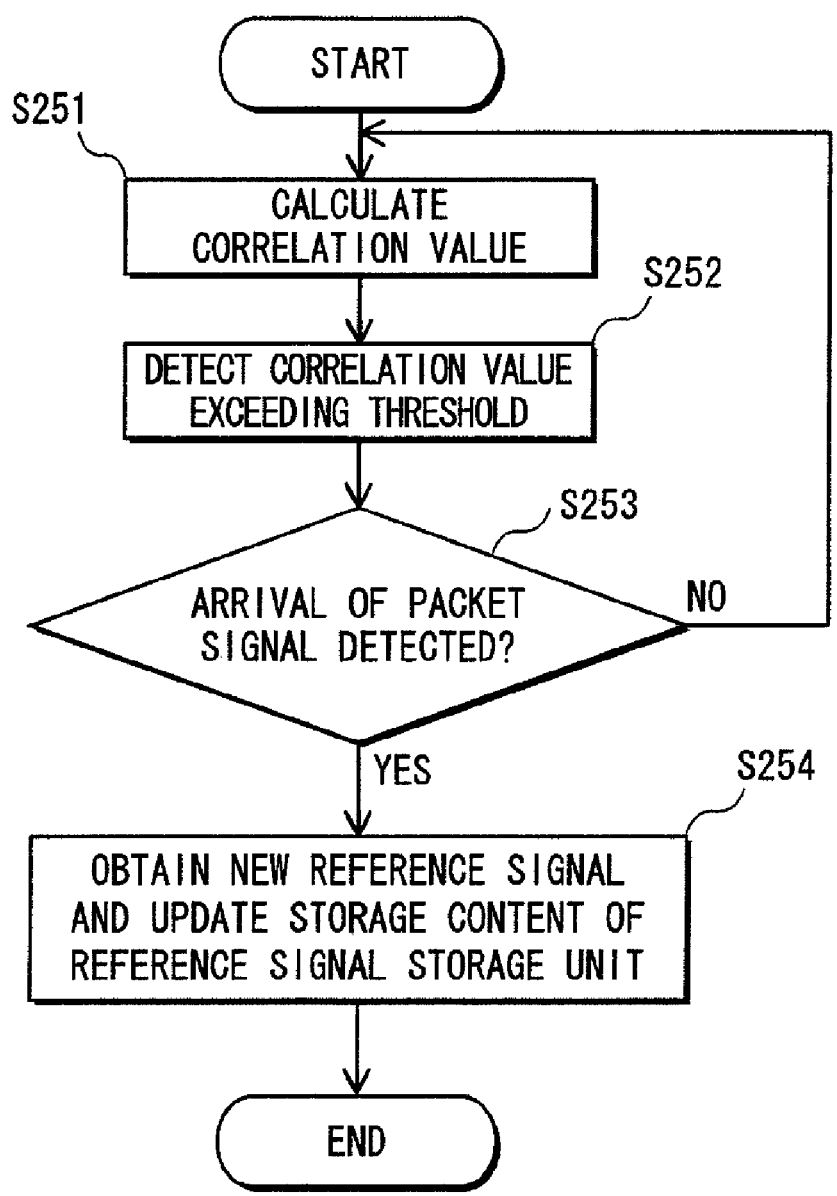
FIG. 18 is a flowchart showing processing procedures of signal detection processing performed by the signal detection unit of FIG. 17.

The following describes the signal detection processing performed by the signal detection unit 13d of FIG. 17 with reference to FIG. 18. FIG. 18 is a flowchart showing processing procedures of signal detection processing performed by the signal detection unit of FIG. 17.

The correlation unit 32 obtains correlation values between the BB signals S12 input by the radio frequency analog unit 12 and the reference signal stored in the reference signal storage unit 31 (step S251).

The position detection unit 34d detects a correlation value that exceeds a predetermined threshold from among correlation values output by the correlation unit 32, and outputs, to the synchronization judgment unit 35d, the third position information indicating the position of the detected correlation value on the time axis (step S252).

The synchronization judgment unit 35d detects an arrival of a packet signal based on the third position information input by the position detection unit 34d (step S253).

If the arrival of a packet signal cannot be detected, (step S253:NO), processing returns to step S251.

If the arrival of a packet signal can be detected (step S253: YES), the reference signal calculation unit 61 obtains a new reference signal with use of the synchronization training signal of the received packet signal, and updates the new reference signal in the storage content of the reference signal storage unit 31 (step S254). By way of this processing, the new reference signal obtained with use of the synchronization training signal of the received packet signal is used for detecting the arrival of the next packet signal.

Embodiment 6

The following describes embodiment 6 of the present invention with reference to the drawings.

In the present embodiment, the reference signal used for calculating the correlation values is updated with use of the synchronization training symbol of the received packet signal, and when a predetermined reset condition is satisfied, the reference signal used for calculating the correlation values is reverted back to the initial reference signal.

Device Structure of Receiver

Figure 19:
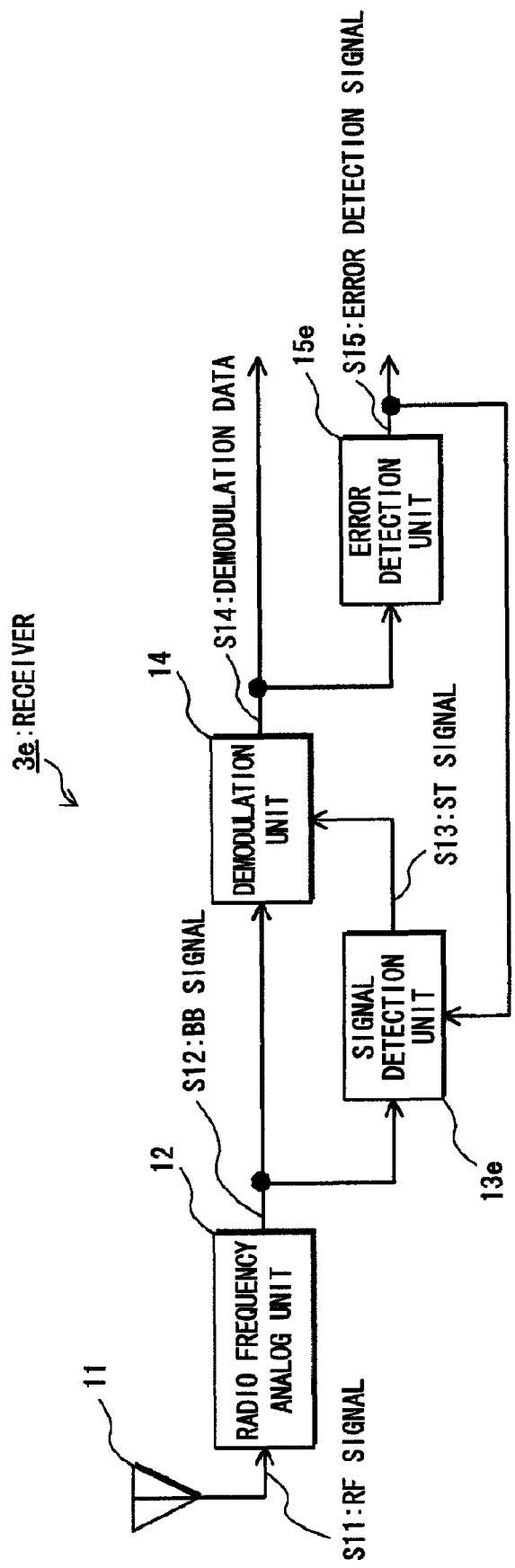
FIG. 19 shows a device structure of a receiver according to embodiment 6.

The device structure of a receiver 3e of the present embodiment is described below with reference to FIG. 19. FIG. 19 shows an device structure of the receiver 3e of the present embodiment. In the present embodiment, structural elements having the same functions as those in the above embodiments have been given the same reference symbols, and since the description of the above embodiments is applicable, such description is omitted in the present embodiment.

The receiver 3e includes the antenna 11, the radio frequency analog unit 12, a signal detection unit 13e (described later with use of FIG. 20), the demodulation unit 14, and an error detection unit 15e.

The error detection unit 15e performs error detection on demodulated data, outputs an error detection signal S15 indicating a result of the detection to a processing circuit (not depicted) at a subsequent stage, and outputs the error detection signal S15 to the signal detection unit 13e.

Functional Structure of Signal Detection Unit

Figure 20:
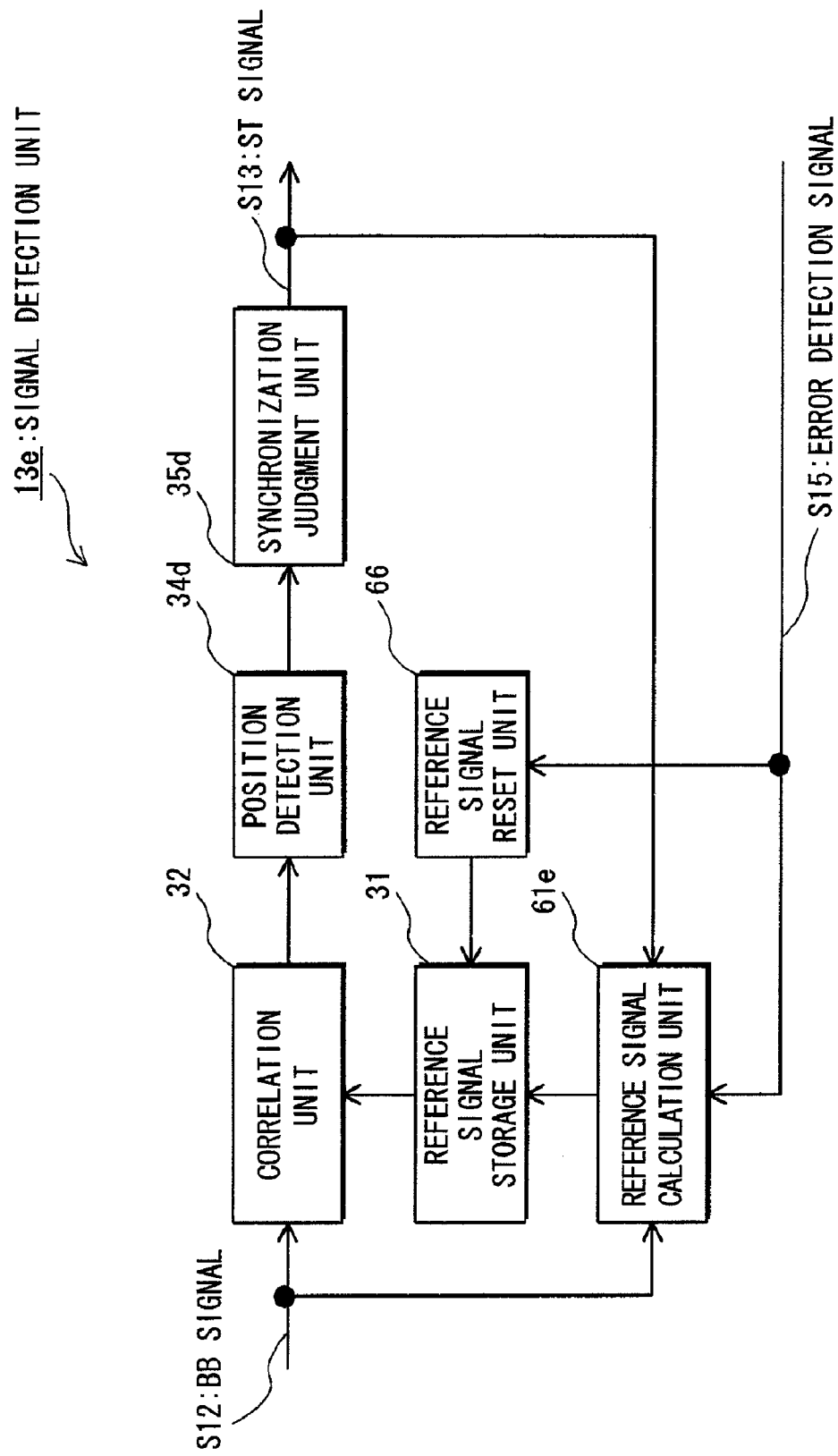
FIG. 20 shows a functional structure of a signal detection unit of FIG. 19.

The following describes a functional structure of the signal detection unit 13e of the present embodiment with reference to FIG. 20. FIG. 20 shows the functional structure of the signal detection unit 13e. In the present embodiment, structural elements having the same functions as those in previous embodiments have been given the same reference symbols, and since the description in previous embodiments is applicable, such description is omitted in the present embodiment.

The signal detection unit 13e includes the reference signal storage unit 31, the correlation unit 32, the position detection unit 34d, the synchronization judgment unit 35d, a reference signal calculation unit 61e, and a reference signal reset unit 66. Note that for example, the reference signal stored in the reference signal storage unit 31 when the power is turned on is the initial reference signal.

When the input of the ST signal S13 has been received, and also an input of an error detection signal S15 indicating that no errors exist in the entire packet signal has been received, the reference signal calculation unit 61e obtains anew reference signal in accordance with the synchronization training signal included in the packet signal in the BB signals S12 that have been input. Specifically, the reference signal calculation unit 61e obtains a new reference signal according to the synchronization training signal included in a packet signal, the arrival of the packet signal having been detected by the synchronization judgment unit 35d, and the error detection unit 15e having detected no errors in the packet signal. The reference signal calculation unit 61e updates the storage content of the reference signal storage unit 61e with the obtained new reference signal.

Note that compared to using signals whose arrival has been detected for calculating the new reference signal, using packet signals whose arrival has been detected and in an entirety of which no errors have been detected for calculating the new reference signal reduces the likelihood of calculating the new reference signal in a portion other than the synchronization training signal.

The following describes a specific example of processing performed by the reference signal calculation unit 61e.

Upon receiving the input of the ST signal S13, the reference signal calculation unit 61e temporarily stores the synchronization training signal of the BB signals S12.

Upon receiving an input of the error detection signal S15 from the error detection unit 15e indicating that no errors have been detected in the entirety of the packet signal, the reference signal calculation unit 61e obtains the new reference signal with use of the temporarily stored synchronization training signal. The reference signal calculation unit 61e updates the storage content of the reference signal storage unit 31 with the new reference signal. Note that the reference signal storage unit 31 discards the synchronization training signal that had been temporarily saved upon receiving, from the error detection unit 15e, an input of the error detection signal S15 indicating that there is an error in the packet signal.

If a predetermined reset condition is satisfied, the reference signal reset unit 66 updates the reference signal stored in the reference signal storage unit 31 to the initial reference signal.

The reset condition is satisfied if the error detection signal S15 indicating that an error has occurred in the packet signal is input to the reference signal reset unit 66 consecutively a predetermined number of times (in the present embodiment, 3 times).

Note that for example, if the reference signal has been updated by the reference signal calculation unit 61e according to a portion of the reception signal other than the synchronization training signal, there are cases in which the state of the channel changes abruptly, and the new reference signal obtained by the reference signal calculation unit 61e no longer reflects the current characteristic of the channel. In such cases, if the new reference signal obtained by the reference signal calculation unit 61e continues to be used for detecting the arrival of packet signals, the ability of the signal detection device to detect the arrival of the packet signals decreases. However, updating the reference signal stored in the reference signal storage unit 31 to the initial reference signal when the reset condition is satisfied enables preventing the decrease in the ability to detect the arrival of the packet signals.

Reception Processing Operation of the Receiver

Figure 21:
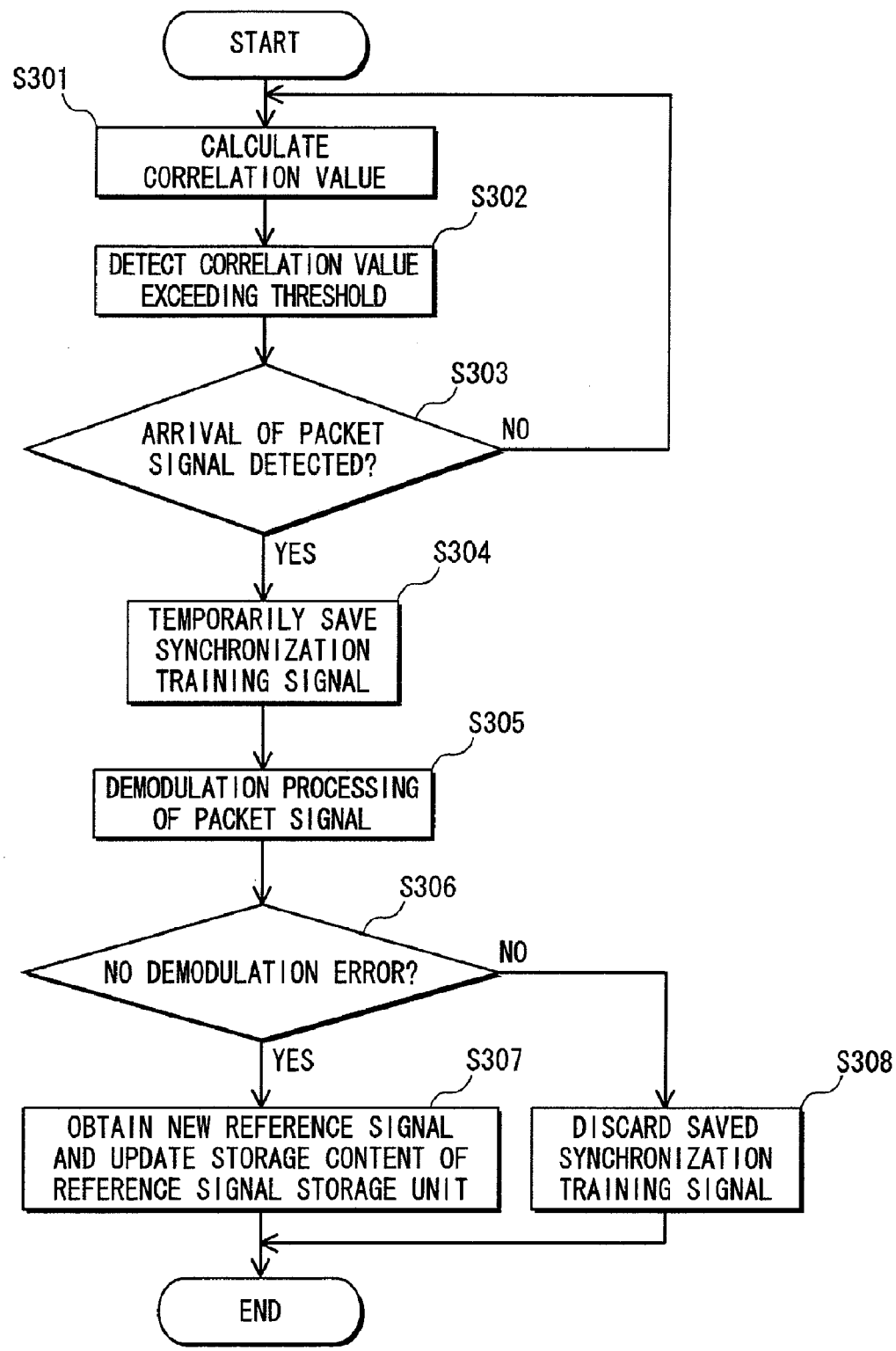
FIG. 21 is a flowchart showing processing procedures of reception processing performed by the receiver of FIG. 19.

The following describes reception processing performed by the receiver 3e of FIG. 19 with reference to FIG. 21. FIG. 21 is a flowchart showing processing procedures of reception processing performed by the receiver 3e of FIG. 19.

The signal detection unit 13e of the receiver 3e performs substantially the same processing as in steps S251 to S253 (steps S301 to S303) of FIG. 18.

If an arrival of a packet signal is detected (step S303:YES), the reference signal calculation unit 61e temporarily stores the synchronization training signal (step S304).

The demodulation unit 14 demodulates the packet signal (step S305), and the error detection unit 15e performs error detection on the demodulated packet signal (step S306).

If no errors have been detected in the demodulated packet signal (step S306:YES), the reference signal calculation unit 61e uses the temporarily stored synchronization training signal to obtain a new reference signal, and updates the content held in the reference signal storage unit 31 with the obtained new reference signal (step S307).

If an error is detected in the demodulated packet signal (step S306:NO), the reference signal calculation unit 61e discards the temporarily stored synchronization training signal (step S308).

Reset Processing Operation Performed by the Reference Signal Reset Unit

Figure 22:
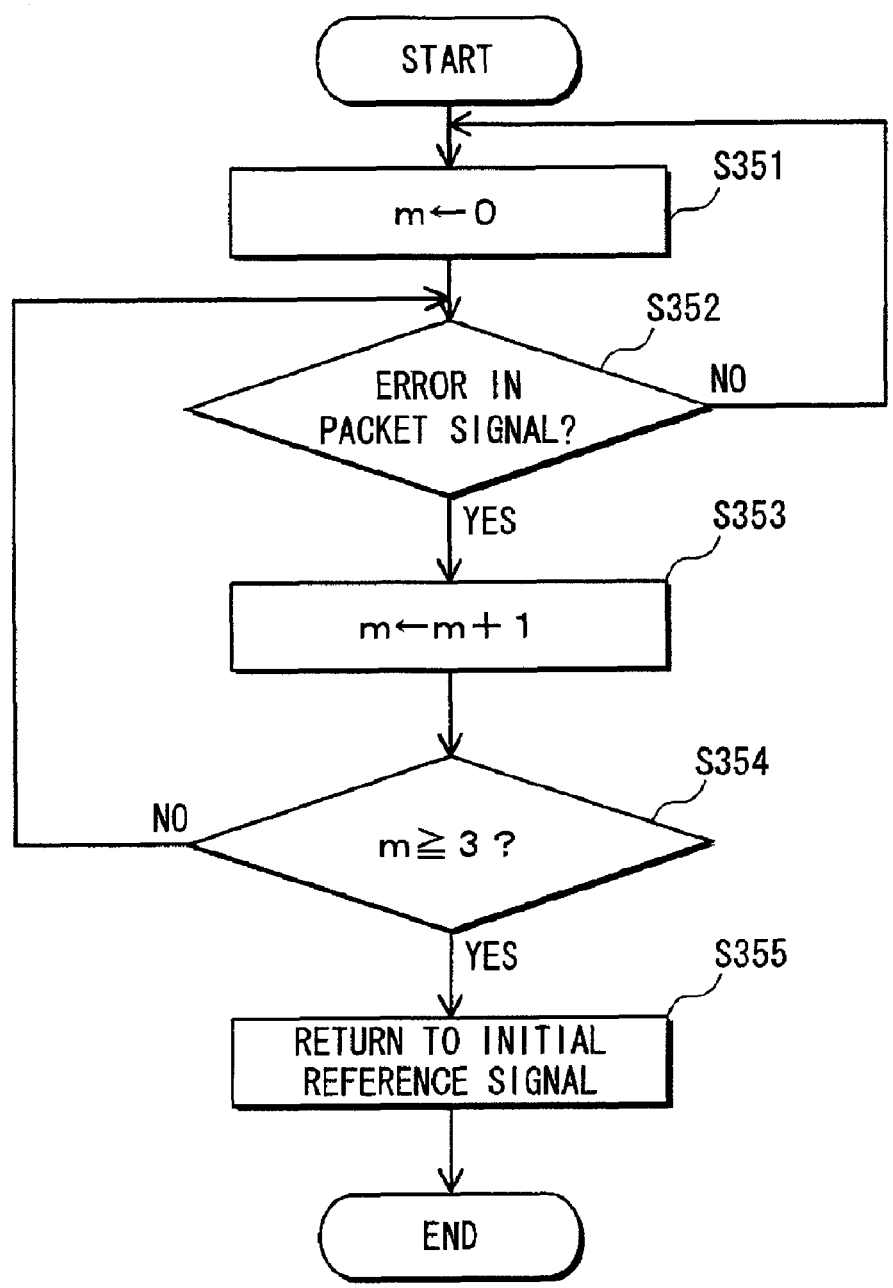
FIG. 22 is a flowchart showing processing procedures of reference signal reset processing performed by a reference signal reset unit of FIG. 20.

The following describes reset processing performed by the reference signal reset unit 66 of FIG. 20 with reference to FIG. 22. FIG. 22 is a flowchart showing processing procedures of the reference signal reset processing performed by the reference signal reset unit 66 of FIG. 20.

The reference signal reset unit 66 sets the value of a variable m to 0 (step S351).

The reference signal reset unit 66 judges whether a packet signal error has been detected according to the error detection signal S15 input by the error detection unit 15e (step S352).

If there are no errors in the packet signal (step S352:NO), processing returns to step S351, the reference signal reset unit 66 sets the value of the variable m as 0, and processing from step S352 onward is performed.

If there is an error in the packet signal (step S352:YES), the reference signal reset unit 66 adds one to the value of the variable m (step S353).

The reference signal reset unit 66 judges whether the value of the variable m is greater than or equal to an error occurrence number "3" (step S354). If the value of the variable m is less than the error occurrence number "3" (step S354:NO), the processing from step S352 onward is performed.

If the value of the variable m is greater than or equal to the number of times of errors "3" (step S354:YES), the reference signal reset unit 66 updates the storage content of the reference signal storage unit 31 with the initial reference signal (step S355).

Embodiment 7

The following describes embodiment 7 of the present invention with reference to the drawings.

In the above embodiments, the detection processing of the packet signals and the estimation processing of the symbol timing are performed in one route.

In contrast, in the present embodiment, the detection processing of the packet signals and the estimation processing of the symbol timing are performed in two routes.

Functional Structure of Signal Detection Unit

Figure 23:
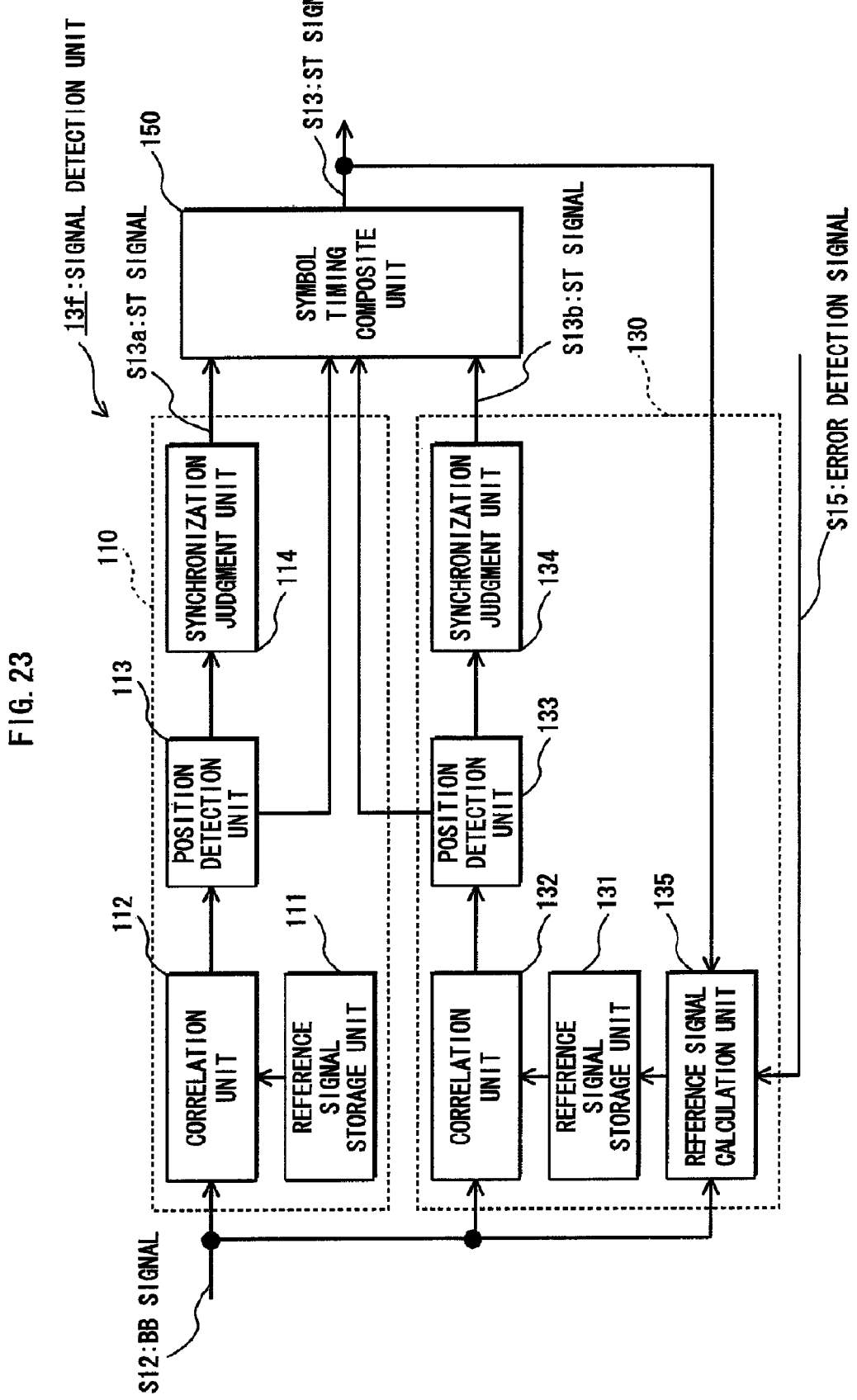
FIG. 23 shows a functional structure of a signal detection unit according to embodiment 7.

The following describes the functional structure of a signal detection unit 13f of the present embodiment with reference to FIG. 23. FIG. 23 shows the functional structure of the signal detection unit 13f according to the present embodiment.

The signal detection unit 13f includes a first processing unit 110, a second processing unit 130, and a symbol timing composite unit 150. The first processing unit 110 and the second processing unit 130 both operate at the same time, and execute processing for detecting the arrival of packet signals and estimating symbol timings.

The first processing unit 110 includes a reference signal storage unit 111, a correlation unit 112, a position detection unit 113, and a synchronization judgment unit 114.

In the first processing unit 110, the reference signal stored in the reference signal storage unit 111 is not updated, and the correlation unit 112 obtains correlation values between the BB signals S12 and a reference signal (the initial reference signal) that always remains the same.

The position detection unit 113 and the synchronization judgment unit 114 perform substantially the same processing as the position detection unit 34d and the synchronization judgment unit 35d of embodiment 5, respectively. The position detection unit 113 outputs, to the symbol timing composite unit 150, a largest value (hereinafter referred to as a largest correlation value) from among the correlation values input by the correlation unit 112. Also, the synchronization judgment unit 114 outputs an ST signal S13a indicating the estimated symbol timing to the symbol timing composite unit 150, instead of to the demodulation unit 14.

The second processing unit 130 includes a reference signal storage unit 131, a correlation unit 132, a position detection unit 133, a synchronization judgment unit 134, and a reference signal calculation unit 135.

In the second processing unit 130, the reference signal stored in the reference signal storage unit 131 is updated by the reference signal calculation unit 135. The correlation unit 132 obtains correlation values between the BB signals S12 and the initial reference signal stored in the reference signal storage unit 231 or the updated reference signal stored in the reference signal storage unit 231.

The position detection unit 133 and the synchronization judgment unit 134 perform substantially the same processing as the position detection unit 34d and the synchronization judgment unit 35d of embodiment 5, respectively. The position detection unit 133 outputs, to the symbol timing composite unit 150, a largest value (hereinafter referred to as a second maximum correlation value) from among the correlation values input by the correlation unit 132. Also, the synchronization judgment unit 134 outputs an ST signal S13b indicating the estimated symbol timing to the symbol timing composite unit 150 instead of to the demodulation unit 14.

The reference signal calculation unit 135 performs substantially the same processing as the reference signal calculation unit 61e of embodiment 6.

The symbol timing composite unit 150 generates an ST signal S13 to provide to the demodulation unit 14 by compositing the ST signal S13a input by the synchronization judgment unit 114 and the ST signal S13b input by the synchronization judgment unit 134.

Specifically, if both the synchronization judgment unit 114 and the synchronization judgment unit 134 detect the arrival of a packet signal, and if both the ST signal S13a and S13b are input, the symbol timing composition unit 150 compares the first maximum correlation value to the second maximum correlation value. Then, if a result of the comparison is that the first maximum correlation value is larger than the second maximum correlation value, the symbol timing composition unit 150 selects the ST signal 13a from among the ST signals 13a and 13b, and outputs the ST signal 13a to the demodulation unit 14 as the ST signal 13. Also, if the result of the comparison is that the second maximum correlation value is larger than the first maximum correlation value, the symbol timing composite unit 150 selects the ST signal 13b from among the ST signals 13a and 13b, and outputs the ST signal 13b to the demodulation unit 14 as the ST signal 13.

The following describes the reason why the symbol timing composite unit 150 makes the selection as described above.

For example, if the first maximum correlation value is larger than the second maximum correlation value, there is a higher probability that the detection of the arrival of the packet signal and the estimation of the symbol timing is correct in the first processing unit 110 than in the second processing unit 130.

When the arrival of the packet signal is detected only by the synchronization judgment unit 114, and the ST signal 13a is input by the synchronization judgment unit 114, the symbol timing composite unit 150 outputs the input ST signal 13a to the demodulation unit 14 as the ST signal 13.

When the arrival of the packet signal is detected only by the synchronization judgment unit 134, and the ST signal 13b is input by the synchronization judgment unit 134, the symbol timing composite unit 150 outputs the input ST signal 13b to the demodulation unit 14 as the ST signal 13.

Note that for the first processing unit 110 to perform processing for detecting the arrival of the packet signal using the initial reference signal, etc., it is not particularly necessary to provide a functional block corresponding to the reference signal reset unit 66 of embodiment 6 in the second processing unit 130 and to update the reference signal to the initial reference signal.

Embodiment 8

The following describes embodiment 8 of the present invention with reference to the drawings.

In the present embodiment, the functions of updating and resetting the reference signal from embodiment 6 have been added to the structure described in embodiment 1.

Functional Structure of the Signal Detection Unit

Figure 24:
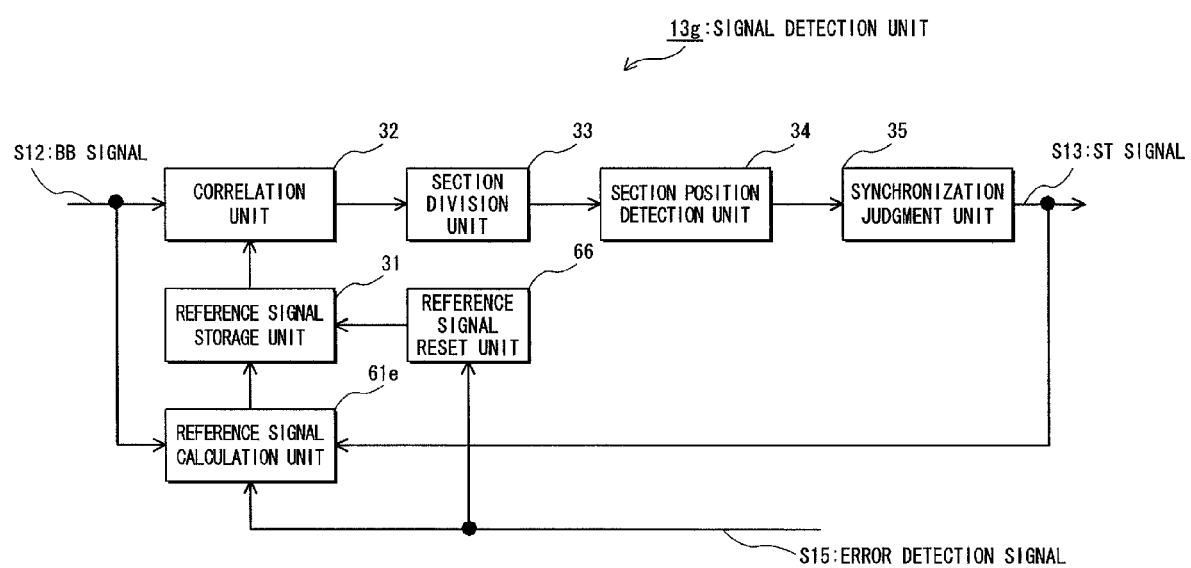
FIG. 24 shows a functional structure of a signal detection unit according to embodiment 8.

The following describes the functional structure of a signal detection unit 13g of the present embodiment with reference to FIG. 24. In the present embodiment, structural elements having the same functions as those in previous embodiments have been given the same reference symbols, and since the description in previous embodiments is applicable, such description is omitted in the present embodiment.

The signal detection unit 13g includes the reference signal storage unit 31, the correlation unit 32, the section division unit 33, the section position detection unit 34, the synchronization judgment unit 35, the reference signal calculation unit 61e, and the reference signal reset unit 66.

The BB signal S12 is input to the signal detection unit 13g, the correlation values between the BB signal S12 and the reference signal stored in the reference signal storage unit 31 are sequentially obtained by the correlation unit 32, and the correlation values are output by the correlation unit 32. The reference signal stored in the reference signal storage unit 31 is updated by the reference signal calculation unit 61e, and is updated to the initial reference signal by the reference signal reset unit 66. In other words, the reference signal used by the correlation unit 32 for calculating the correlation value is not fixed as in embodiment 1.

The output of the correlation unit 32 is divided into symbol time lengths by the section division unit 33. The largest correlation value in each section is detected by the section position detection unit 34, and first position information that indicates a relative position of the detected largest correlation value in the section is output by the section position detection unit 34 to the synchronization judgment unit 35. The synchronization judgment unit 35 performs processing such as detection of the arrival of the packet signal and estimation of the symbol timing in accordance with the first position information of each section, and outputs the ST signal S13 to the demodulation unit 14 and the reference signal calculation unit 61e.

If the arrival of the packet signal has been detected, and an error has not been detected in the detected packet signal, the reference signal stored in the reference signal storage unit 31 is updated in accordance with the synchronization training symbol of the packet signal by the reference signal calculation unit 61e.

Also, if the reset condition is satisfied, the reference signal stored in the reference signal storage unit 31 is updated to the initial reference signal by the reference signal reset unit 66.

Embodiment 9

In the present embodiment, the functions of updating and resetting the reference signal from embodiment 6 have been added to the structure described in embodiment 2.

Functional Structure of Signal Detection Unit

Figure 25:
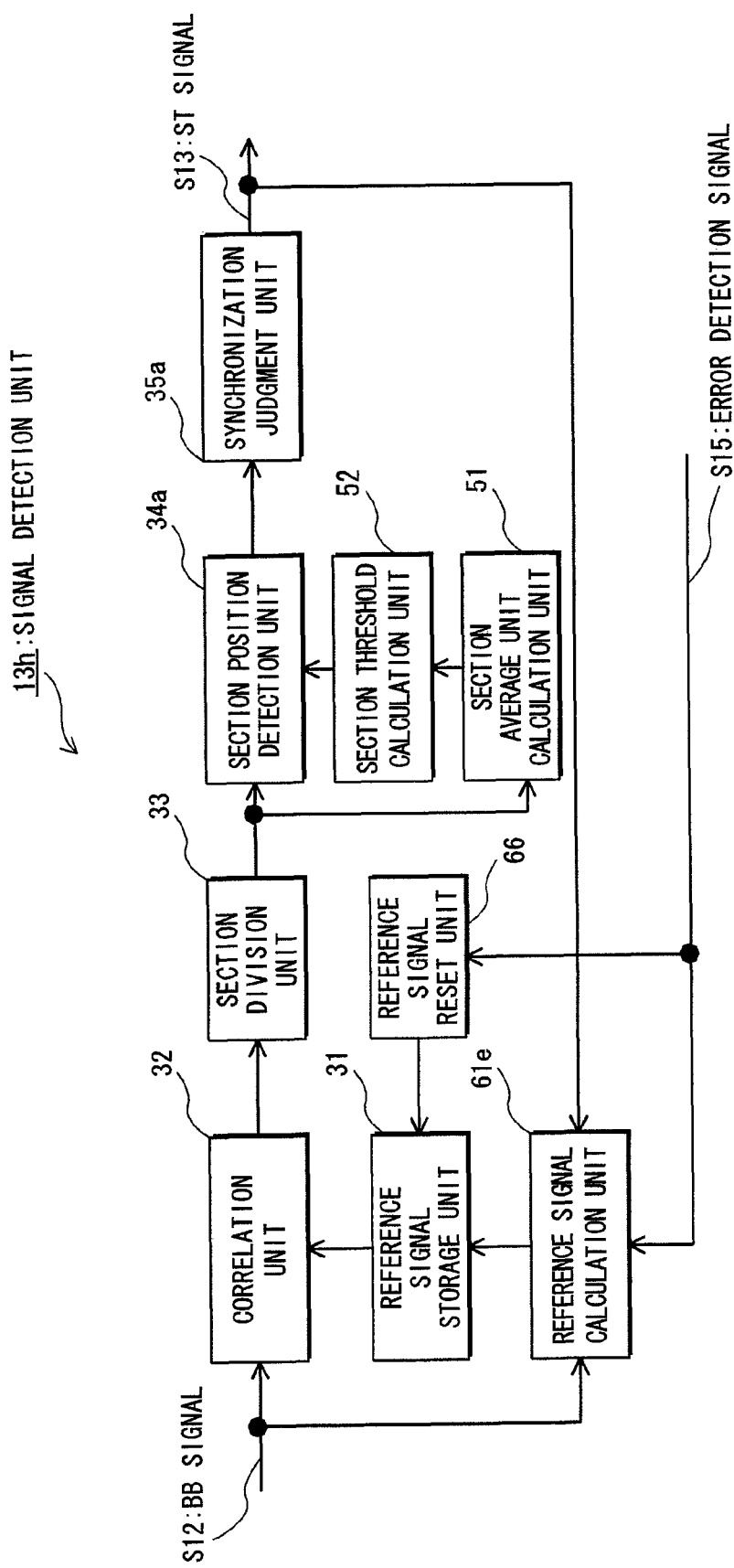
FIG. 25 shows a functional structure of a signal detection unit according to embodiment 9.

The following describes a functional structure of a signal detection unit 13h of the present embodiment with reference to FIG. 25. FIG. 25 shows the functional structure of the signal detection unit 13h according to the present embodiment. In the present embodiment, structural elements having the same functions as those in previous embodiments have been given the same reference symbols, and since the description in the previous embodiments is applicable, such description is omitted in the present embodiment.

The signal detection unit 13h includes the reference signal storage unit 31, the correlation unit 32, the section division unit 33, the section average value calculation unit 51, the section threshold calculation unit 52, the section position detection unit 34a, the synchronization judgment unit 35a, the reference signal calculation unit 61e, and the reference signal reset unit 66.

The BB signals S12 are input to the signal detection unit 13h, correlation values between the BB signals S12 and the reference signal stored in the reference signal storage unit 31 are sequentially obtained by the correlation unit 32, and the correlation values are output by the correlation unit 32. The reference signal stored in the reference signal storage unit 31 is updated by the reference signal calculation unit 61e, and is updated to the initial reference signal by the reference signal reset unit 66. In other words, the reference signal used by the correlation unit 32 for calculating the correlation values is not fixed as in embodiment 2.

The output of the correlation unit 32 is divided into symbol time lengths by the section division unit 33.

For each section, the average value of the correlation values in each section is calculated by the section average value calculation unit 51, and with use of the calculated average value, a threshold is calculated for each of the sections by the section threshold calculation unit 52. The section threshold calculation unit 52 sets the calculated threshold in the section position detection unit 34a.

For each section, a correlation value that exceeds the threshold is detected by the section position detection unit 34a. Second position information indicating a relative position in the section of each of the correlation values that exceed the threshold is output by the section position detection unit 34a to the synchronization judgment unit 35a. The synchronization judgment unit 35a performs processing such as detecting the arrival of the packet signal and estimation of the symbol timing in accordance with the second position information of each of the sections, and outputs the ST signal S13 to the demodulation unit 14 and the reference signal calculation unit 61e.

If the arrival of the packet signal has been detected, and an error has not been detected in the detected packet signal, the reference signal stored in the reference signal storage unit 31 is updated in accordance with the synchronization training symbol of the packet signal by the reference signal calculation unit 61e.

Also, if the reset condition is satisfied, the reference signal stored in the reference signal storage unit 31 is updated to the initial reference signal by the reference signal reset unit 66.

Embodiment 10

The following describes embodiment 10 of the present invention with reference to the drawings.

In the present embodiment, processing is performed for detecting the packet signal and estimating the signal timing in two routes.

Functional Structure of Signal Detection Unit

Figure 26:
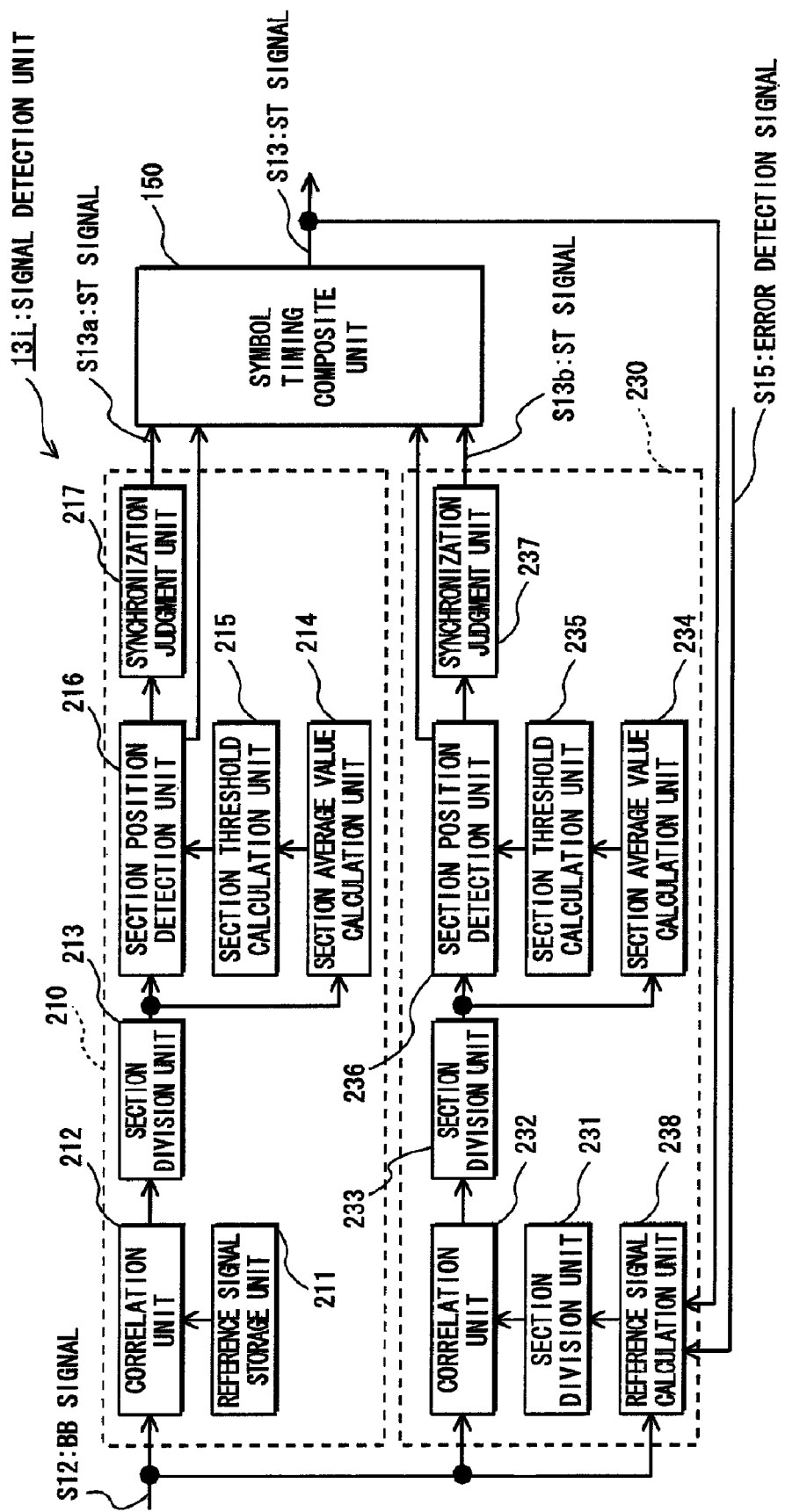
FIG. 26 shows a functional structure of a signal detection unit according to embodiment 10.

The following describes a functional structure of a signal detection unit 13i of the present embodiment with reference to FIG. 26. FIG. 26 shows the functional structure of the signal detection unit 13i according to the present embodiment. In the present embodiment, structural elements having the same functions as those in previous embodiments have been given the same reference symbols, and since the description in the previous embodiments is applicable, such description is omitted in the present embodiment.

The signal detection unit 13*i* includes a first processing unit 210, a second processing unit 230, and a symbol timing composite unit 150. The processing for detecting the arrival of a packet signal and the processing for estimating the symbol timing are executed by causing the first processing unit 210 and the second processing unit 230 to operate at the same time.

The first processing unit 210 includes a reference signal storage unit 211, a correlation unit 212, a section division unit 213, a section average value calculation unit 214, a section threshold calculation unit 215, a section position detection unit 216, and a synchronization judgment unit 217.

In the first processing unit 210, the reference signal stored in the reference signal storage unit 211 is not updated, and the correlation unit 212 obtains correlation values between the BB signals S12 and a reference signal (the initial reference signal) that always remains the same.

The section division unit 213, the section average value calculation unit 214, the section threshold calculation unit 215, the section position detection unit 216, and the synchronization judgment unit 217 perform substantially the same processing as the section division unit 33, the section average value calculation unit 51, the section threshold calculation unit 52, the section position detection unit 34*a*, and the synchronization judgment unit 35*a* of embodiment 2, respectively. The section position detection unit 216 outputs a correlation value having the largest value obtained by the correlation unit 212 to the symbol timing composite unit 150. Also, the synchronization judgment unit 217 outputs the ST signal timing S13*a* indicating the estimated symbol timing to the symbol timing composite unit 150, instead of to the demodulation unit 14.

The second processing unit 230 includes a reference signal storage unit 231, a correlation unit 232, a section division unit 233, a section average value calculation unit 234, a section threshold calculation unit 235, a section position detection unit 236, a synchronization judgment unit 237, and a reference signal calculation unit 238.

In the second processing unit 230, the reference signal stored in the reference signal storage unit 231 is updated by the reference signal calculation unit 238. The correlation unit 232 obtains correlation values between the BB signals S12 and the initial reference signal stored in the reference signal storage unit 231 or the updated reference signal stored in the reference signal storage unit 231.

The section division unit 233, the section average unit calculation unit 234, the section threshold calculation unit 235, the section position detection unit 236, and the synchronization judgment unit 237, respectively, perform substantially the same processing as the section division unit 33, the section average value calculation unit 51, the section threshold calculation unit 52, the section position detection unit 34*a*, and the synchronization judgment unit 35*a* in embodiment 2. The section position detection unit 236 outputs a correlation value having the largest value obtained by the correlation unit 232 to the symbol timing composite unit 150. Also, the synchronization judgment unit 237 outputs the ST signal timing S13*b* indicating the estimated symbol timing to the symbol timing composite unit 150 instead of to the demodulation unit 14.

The reference signal calculation unit 238 performs substantially the same processing as the reference signal calculation unit 61*e* of embodiment 6.

Supplementary Remarks

The present invention is not limited to the above embodiments, and for example, may include the following variations.

(1) Although the modulation and demodulation method is the OFDM method that is used with a wireless LAN in the above embodiments, the modulation and demodulation method is not limited to this. The modulation and demodulation method may be, for example, a single carrier method such as QPSK (Quadrature Phase Shift Keying) or QAM (Quadrature Amplitude Modulation). Also, the modulation and demodulation method may be a spread spectrum method such as CDMA (Code Division Multiple Access).

(2) Although the wireless LAN is compliant with IEEE802.11a standards in the above embodiments, the wireless LAN standards are not limited to being IEEE802.11a, and may be, for example, IEEE802.11g.

(3) In the above embodiments, since the wireless LAN is compliant with IEEE802.11a standards, the symbol used for detection of the packet signal, etc. is repeated 10 times. However, the number of times that the symbol repeats is not limited to this, and can be changed as appropriate depending on the standards being used, etc.

(4) In embodiment 1, the section division unit 33 sets the symbol time period of the symbol as the fixed time period in which to divide the output of the correlation unit 32. However, the fixed time period is not limited to this. The fixed time period may be, for example, a time period that is two or more times an integral multiple of the symbol time period of the symbol. Note that the same is also true in other embodiments that include the section division unit 33.

(5) Although in embodiment 1, sequential numbers are assigned to each of the positions in the section, and the sequential numbers are used as information indicating the relative positions in the section, the information indicating the relative position in the section is not limited to this. For example, relative times based on one of the positions in the section may be assigned, and the assigned times may be used as the information indicating the relative positions in the section. Note that the same is true in other embodiments that use the section position detection units 34, 34*a*, 216, and 236.

(6) Instead of detecting the largest correlation value in the section in embodiment 1, the section position detection unit 34 may detect correlation values from a largest correlation value in each section to an Nth largest correlation value, inclusive, N being a predetermined value, and output position information indicating the position of each detected correlation value to the synchronization judgment unit 35. In such a case, the synchronization judgment unit 35 judges that the packet has arrived based on the position information input by the section position detection unit 34 if a correlation value at one position is included in a predetermined number of correlation values from a largest correlation value in each section to an Nth largest correlation value, inclusive, N being a predetermined value, in all of a number of consecutive sections that is greater than or equal to the predetermined consecutive section number.

Note that the above content can be applied to embodiments 3 and 8, for example. When applied to embodiment 3, the synchronization judgment unit 35*b* detects that the packet signal has arrived if the number of matching sections among the accumulation section number of sections is greater than or equal to the predetermined number of matching sections, each matching section being a section in which a correlation value at a position indicated by the largest position information matches one of the correlation values between a largest correlation value and a predetermined number of correlation values in descending size order from the largest correlation value.

(7) In embodiment 2, the threshold of each section is determined by multiplying the average value of the correlation values in the section by a fixed coefficient. However, the method of determining the threshold is not limited to this. For example, the threshold of each section may be determined by adding a predetermined value to the average value of the section. Also, the average value may simply be used as the threshold. Note that the above matter can also be applied to embodiments 4, 9, and 10, for example.

(8) Although in embodiment 3, the accumulation section number is 10, the accumulation section number is not limited to being 10, and for example may be determined in accordance with a number of times that the symbol is repeated. Note that the same is true in embodiment 4, for example.

(9) Although in embodiment 3, the threshold section number is 7, the threshold section number is not limited to being 7, and for example, may be determined according to the accumulation section number. Note that the same is true in embodiment 4, for example.

(10) The reference signal calculation unit 61 described in embodiment 5 and the reference signal calculation unit 61e described in embodiment 6 may also be applied to embodiments 3 and 4.

(11) The reference signal reset unit 66 described in embodiment 6 may also be applied to embodiments 3 and 4.

(12) In embodiment 5, the received packet signal used for calculating the reference signal is a packet signal whose arrival has been detected by the synchronization judgment unit 35d. In embodiment 6, the received packet signal used for calculating the reference signal is a packet signal whose arrival has been detected by the synchronization judgment unit 35d, and in which no errors have been detected overall by the error detection unit 15e. However, the received packet signal used for calculating the reference signal is not limited to this, and for example, may be a packet whose arrival has been detected, and for which no error has been detected in the header information. In this case, for example, provided that the error detection ability when errors are detected by error detection code in the header information is sufficiently larger than error detection ability when using the synchronization training signal, the possibility of the reference signal being updated with use of a portion other than the synchronization training signal is low.

Note that the matter described above can also be applied to embodiments having the reference signal calculation units 61 and 61e.

(13) In embodiment 5, in the calculation of the reference signal by the reference signal calculation unit 61, only the rearmost symbol of the synchronization training signal of the received packet signal is used. However, the reference signal calculation unit 61 may also obtain the new reference signal with use of, for example, the portion of the synchronization training signal of the received packet signal described below.

The reference signal calculation unit 61 may average a predetermined symbol number of symbols starting from the rearmost symbol of the synchronization training signals of the received packet signal and proceeding in reverse order, and use the signal obtained as a result as the new reference signal. Averaging the predetermined symbol number of symbols enables reducing the influence of noise and interference, etc.

Also, the reference signal calculation unit 61 may average, from among the symbols of the synchronization training signal of the received packet, symbols in a predetermined average power value range or average amplitude value range, and use a signal obtained as a result as the new reference signal. When the received power level of the packet signal is larger, the synchronization training signal of the packet signal is influenced by AGC for a longer time. For this reason, averaging symbols that are in the average power value range or the average amplitude value range from among the symbols of the synchronization training symbol enables obtaining a reference signal from a symbol that has not been influenced by AGC, even when there is fluctuation in the received power level of the packet signal.

Note that the above matter can also be applied to other reference signal calculation units, such as the reference signal calculation unit 61e.

In particular, if the symbols are averaged in the reference signal calculation unit, setting $2^N$ (N is an integer) as the number of symbols to be averaged enables averaging with use of only an adder and bit shifting, thus suppressing an increase in the amount of circuitry.

(14) In embodiment 5, the reference signal calculation unit 61 only uses the newest received packet signal for calculating the reference signal. However, for example, packet signals that include a newest received packet signal and a predetermined number of packet signals in descending order of newness may be used. Note that the phase of the carrier wave when the packet signal is received varies for each packet signal. For this reason, if the reference signal is calculated by performing averaging processing on the predetermined packet number worth of packet signals, it is necessary to perform averaging processing after correcting the symbol phase. Specifically, correlation values between the symbols are obtained, and a phase component of the correlation values is obtained. Since this phase component indicates phase differences between the symbols, averaging processing need only be performed on the predetermined number of packet signals after the phase has been reversed to the opposite direction.

Note that the matter described above may also be applied to another reference signal calculation unit such as the reference signal calculation unit 61e.

(15) Although the reference signal calculation unit 61 always uses the newest received packet signal for calculating the reference signal in embodiment 5, for example, the following may also be used.

For example, the reference signal calculation unit 61 may calculate the reference signal with use of the newest received packet signal if channel variation is comparatively fast, and with use of packet signals that include the newest received packet signal and a predetermined number of packet signals in descending order of newness if the channel variation is comparatively slow. Note that the reference signal calculation unit 61 may detect the speed of the channel variation based on changes in correlation values, and switch between using only the newest packet signal and using the packet signals that include the newest received packet signal and the predetermined number of packet signals in descending order of newness for calculating the reference signal, in accordance with the result of the detection.

Note that the matter described above can also be applied to another reference signal calculation unit such as the reference signal calculation unit 61e.

(16) In embodiment 6, the reset condition is satisfied if an error in the packet signal is detected in a predetermined number of sequential error frequency number of packet signals. However, the reset condition is not limited to this, and may be the following, for example.

The reset condition may be satisfied when errors in the packet signal are detected in the predetermined error frequency number of packet signals, even if the errors are not sequential.

Also, the reset condition may be satisfied when the errors in the header information are detected sequentially in the predetermined error frequency number of packet signals, and when errors in the header information are detected in the predetermined error frequency number of packet signals, even if not sequential.

Furthermore, the reset condition may be satisfied when a predetermined time period has passed since the storage content of the reference signal storage unit 31 has last been updated. In other words, the reset condition may be satisfied when the storage content of the reference signal storage unit 31 has not been updated in a predetermined amount of time. Note that in general, since there are many cases in which a state of multipath distortion fluctuates temporally and is not constant, after the reference signal has been updated once, if the predetermined time period passes and the reference signal has not been updated again, there is a high likelihood of the state of multipath distortion changing drastically from the point when the reference signal is updated. Accordingly, this enables avoiding a situation in which the reference signal does not completely reflect the channel characteristic, and the packet signal cannot be detected.

Furthermore, the reset condition may be satisfied when the packet signal has been estimated to have arrived a predetermined number of times and the synchronization judgment unit 35*d* cannot detect the arrival of the packet signal a plurality of times sequentially. Also, the reset condition may be satisfied when the packet signal has been estimated to have arrived a predetermined number of times and the synchronization judgment unit 35*d* cannot detect the arrival of the packet signal a plurality of times, even if not sequentially. Note that the estimation of the arrival of the packet signal can be performed by providing a circuit that measures a received power level of the reception signal, and estimation of the arrival of the packet signal can be performed according to changes in the measured received power level of the reception power level. When the reset condition is satisfied, the reference signal reset unit 66 may update the storage content of the reference signal storage unit 31 in accordance with the result of estimating the arrival of the packet signal and the result of detecting the arrival of the packet signal by the synchronization judgment unit 35*d*.

The reset condition described above may also be applied to other embodiments.

(17) In embodiments 7 and 10, if the ST signals 13*a* and 13*b* are both input into the symbol timing composite unit 150, either the ST signal 13*a* or the ST signal 13*b* is selected and used as the ST signal 13 according to the first maximum correlation value and the second maximum correlation value. However, the present invention is not limited to this, and for example, the following method may also be used. An average value, or a composite value that is a weighted composite, of a symbol timing indicated by the ST signal 13*a* and a symbol timing indicated by the ST signal 13*b* may be obtained, and the obtained symbol timing may be the symbol timing indicated by the ST signal 13.

(18) The processing performed by the section average value calculation unit 214, the section position detection unit 216, and the synchronization judgment unit 217 of the first processing unit 210 in embodiment 10 may be replaced by substantially the same processing performed by the section position detection unit 34 and the synchronization judgment unit 35 of embodiment 1.

Also, the processing performed by the section average value calculation unit 214, the section threshold calculation unit 215, the section position detection unit 216, and the synchronization judgment unit 217 of the first processing unit 210 may be replaced by substantially the same processing performed by the correlation value accumulation unit 56, the largest position detection unit 57, the section position detection unit 34, and the synchronization judgment unit 35*b* of embodiment 3.

Furthermore, the processing performed by the section average unit calculation unit 214, the section average value calculation unit 215, the section position detection unit 216, and the synchronization judgment unit 217 of the first processing unit 210 may be replaced by substantially the same processing performed by the section average value calculation unit 51, the section threshold calculation unit 52, the section position detection unit 34*a*, the correlation value accumulation unit 56, the largest position detection unit 57, and the synchronization judgment unit 35*b* of embodiment 4.

Note that similar replacements may be made to the second processing unit 230.

(19) The above embodiments can also be applied to a wireless LAN system that uses, for example, CSMA (Carrier Sense Multiple Access), and to wireless communication systems using various access methods such as TDMA (Time Division Multiple Access), FDMA (Frequency Division Multiple Access), CDMA (Code Division Multiple Access), and SDMA (Space Division Multiple Access).

(20) The structures of the embodiments described above may be realized representatively by an LSI (Large Scale Integration). Such structures may be realized as individual chips, or some or all of the function blocks may be constituted as a single chip.

The LSI referred to here is also called an IC (Integrated Circuit), a system LSI, a super LSI, or an ultra LSI, depending on the degree of integration.

Also, the method of integrating circuits is not limited to LSI, and may also be realized by a dedicated circuit. A field programmable gate array (FPGA) or a silicon flexible processor in which the connection and settings of circuit cells in the LSI can be restructured after LSI manufacture can also be used.

Furthermore, if integration technology is developed that replaces LSIs due to progressive or derivative semiconductor technology, integration of functional blocks using this technology is naturally possible. For example, the adaptation of biotechnology is a possibility.

INDUSTRIAL APPLICABILITY

The present invention can be used in a signal detection device that detects the arrival of a packet signal based on a training signal added to packet signals, in particular packet signals burst-transmitted by a method such as CSMA or TDMA.

The invention claimed is:

1. A signal detection device that detects an arrival of a packet signal in a reception signal, based on a plurality of symbols that are signal waveforms having a predetermined pattern and have been added to a head of the packet signal by a transmitter, the signal detection device comprising:
   a correlation unit operable to sequentially obtain correlation values between the reception signal and a reference signal that is based on the plurality of symbols, and output the correlation values;

a section division unit operable to divide the output of the correlation unit into sections that are each a time period having a fixed length;

a section position detection unit operable to detect, for each of the sections, a correlation value that satisfies a predetermined condition from among the correlation values in the section, and output position information indicating a relative position of the detected correlation value in the section; and a synchronization judgment unit operable to detect the arrival of the packet signal based on the position information of the sections output by the section position detection unit.

2. The signal detection device of claim 1, wherein the predetermined condition is satisfied by a largest correlation value in each section.

3. The signal detection device of claim 1, wherein the predetermined condition is satisfied by correlation values from a largest correlation value in each section to an Nth largest correlation value, inclusive, N being a predetermined value.

4. The signal detection device of claim 1, further comprising:

a section average value calculation unit operable to, for each section, obtain an average value of all correlation values in the section; and a section threshold determination unit operable to, for each section, determine a threshold for the section based on the average value of all the correlation values in the section obtained by the section average value calculation unit, and set the determined threshold in the section position detection unit, wherein for each section, the section position detection unit detects a correlation value that satisfies the predetermined condition by comparing each correlation value in the section to the threshold set in the section to which the correlation values belong, and the predetermined condition is satisfied by a correlation value in each section that is larger than a threshold set individually in each section.

5. The signal detection device of claim 1, wherein the fixed length is a positive integral multiple of a length of time of one of the plurality of symbols.

6. The signal detection device of claim 2, wherein the synchronization judgment unit judges that the packet signal has arrived if a same position is indicated by the position information of a plurality of consecutive sections, and the number of the consecutive sections is greater than or equal to a predetermined number of consecutive sections.

7. The signal detection device of claim 1, further comprising:

a correlation value accumulation unit operable to obtain an accumulation value for each relative position over a predetermined accumulation section number of sections, by accumulating correlation values at a same relative position; and a judgment position detection unit operable to detect, from among the accumulation values obtained by the correlation value accumulation unit, an accumulation value that satisfies a predetermined judgment position condition, and to output judgment position information indicating a position of the detected accumulation value that satisfies the judgment position condition, wherein the synchronization judgment unit detects the arrival of the packet signal at the position indicated by the judgment position information output by the judgment position detection unit.

8. The signal detection device of claim 7, wherein the predetermined judgment position condition is satisfied by a largest accumulation value.

9. The signal detection device of claim 7, wherein the synchronization judgment unit judges that the packet signal has arrived if a number of matching sections among the predetermined accumulation section number of sections is greater than or equal to a predetermined number of matching sections, each matching section being a section whose position information indicates a same position as the position indicated by the judgment position information.

10. The signal detection device of claim 1, further comprising:

a storage unit storing therein the reference signal; and a reference signal calculation unit operable to obtain a new reference signal based on the received packet signal, and to update the reference signal stored in the storage unit to the new reference signal, wherein the correlation unit obtains the correlation values with use of the reference signal stored in the storage unit.

11. The signal detection device of claim 10, further comprising:

a reset unit operable to update the reference signal stored in the storage unit to a signal having a signal waveform that is identical to the predetermined pattern, if a predetermined reset condition is satisfied.

12. The signal detection device of claim 10, wherein the synchronization judgment unit is further operable to estimate a symbol timing based on the position information of the sections output by the section position detection unit, and the signal detection device further comprises:

a first correlation unit operable to sequentially obtain correlation values between the reception signal and a signal having a same signal waveform as the plurality of symbols, and output the correlation values;

a first section division unit operable to divide the output of the first correlation unit into sections that are each a time period having a fixed length;

a first section position detection unit operable to detect, for each of the sections, a correlation value that satisfies the predetermined condition from among the correlation values in the section, and output sub-position information indicating a relative position of the detected correlation value in the section;

a first synchronization judgment unit operable to detect the arrival of the packet signal and estimate the symbol timing based on the sub-position information of the sections output by the first section position detection unit; and a composite unit operable to composite the symbol timing estimated by the synchronization judgment unit and the symbol timing estimated by the first synchronization judgment unit.

13. The signal detection device of claim 10, wherein among a plurality of received packet signals, a packet signal whose arrival has been detected is used for obtaining the new reference signal.

14. The signal detection device of claim 10, wherein among a plurality of received packet signals, a packet signal whose arrival has been detected and whose header information is free of detected errors is used for calculating the new reference signal.

15. The signal detection device of claim 10, wherein among a plurality of received packet signals, a packet signal whose arrival has been detected, and that is entirely free of detected errors is used for calculating the new reference signal.

16. The signal detection device of claim 10, wherein the reference signal calculation unit obtains the new reference signal based on a newest received packet signal.

17. The signal detection device of claim 10, wherein the reference signal calculation unit obtains the new reference signal based on packet signals that include a newest received packet signal and a predetermined number of packet signals in descending order of newness.

18. The signal detection device of claim 10, wherein the reference signal calculation unit obtains the new reference signal based on a rearmost symbol from among the plurality of symbols added to the head of the received packet signal.

19. The signal detection device of claim 10, wherein the reference signal calculation unit obtains the new reference signal based on symbols that include, among the plurality of symbols added to the head of the received packet signal, a rearmost symbol and a predetermined number of packet signals in descending order.

20. The signal detection device of claim 10, wherein the reference signal calculation unit obtains the new reference signal based on one of a symbol in a predetermined power range and a symbol in a predetermined amplitude range, from among the plurality of symbols added to the head of the received packet signal.

21. The signal detection device of claim 11, wherein the reset condition is satisfied if a packet signal error is detected in a predetermined number of packets in the packet signal.

22. The signal detection device of claim 11, wherein the reset condition is satisfied if a header information error is detected in a predetermined number of packets in the packet signal.

23. The signal detection device of claim 11, wherein the reset condition is satisfied if the reference signal stored in the storage unit is not updated in a predetermined time period.

24. The signal detection device of claim 11, further comprising:
an estimation unit operable to measure a reception power level of the reception signal, and to estimate the arrival of the packet signal based on the measured reception power level, wherein
the reset condition is satisfied if the synchronization judgment unit cannot detect the arrival of the packet signal in a case that the packet signal has been estimated to arrive a predetermined number of times, and
if the reset condition is satisfied, the reset unit updates storage content of the storage unit to reflect a result of the packet signal arrival estimation performed by the estimation unit, and a result of the packet signal arrival detection performed by the synchronization judgment unit.

25. A signal detection method for detecting an arrival of a packet signal in a reception signal, based on a plurality of symbols that are signal waveforms having a predetermined pattern and have been added to a head of the packet signal by a transmitter, the signal detection method comprising the steps of:
sequentially obtaining correlation values between the reception signal and a reference signal that is based on the plurality of symbols, and outputting the correlation values;
dividing the output of the obtaining step into sections that are each a time period having a fixed length;
detecting, for each of the sections, a correlation value that satisfies a predetermined condition from among the correlation values in the section, and outputting position information indicating a relative position of the detected correlation value in the section; and
detecting the arrival of the packet signal based on the position information of the sections output in the detecting step.

* * * * *